(12) United States Patent
Oya et al.

(10) Patent No.: US 8,169,116 B2
(45) Date of Patent: *May 1, 2012

(54) ELECTRIC MOTOR

(75) Inventors: Satoyoshi Oya, Saitama-ken (JP); Kota Kasaoka, Saitama-ken (JP); Noriyuki Abe, Saitama-ken (JP); Shigemitsu Akutsu, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/920,689

(22) PCT Filed: Feb. 18, 2009

(86) PCT No.: PCT/JP2009/052780
§ 371 (c)(1),
(2), (4) Date: Sep. 2, 2010

(87) PCT Pub. No.: WO2009/128287
PCT Pub. Date: Oct. 22, 2009

(65) Prior Publication Data
US 2011/0001364 A1 Jan. 6, 2011

(30) Foreign Application Priority Data
Apr. 14, 2008 (JP) ................................. 2008-105058

(51) Int. Cl.
*H02K 7/102* (2006.01)
(52) U.S. Cl. ........................................ 310/112; 310/114
(58) Field of Classification Search .......... 310/112–114, 310/68 B
See application file for complete search history.

(56) References Cited

U.S. PATENT DOCUMENTS

| 6,239,530 | B1* | 5/2001 | Garcia .................... 310/216.109 |
| 6,998,757 | B2* | 2/2006 | Seguchi et al. ............... 310/266 |
| 7,626,299 | B2* | 12/2009 | Yoshikawa et al. ........... 310/114 |
| 2008/0036330 | A1 | 2/2008 | Abe et al. | |
| 2008/0211335 | A1 | 9/2008 | Abe et al. | |
| 2011/0109180 | A1* | 5/2011 | Akutsu et al. .................... 310/77 |

FOREIGN PATENT DOCUMENTS

| JP | 2001-157304 | 6/2001 |
| JP | 2002-017004 | 1/2002 |
| JP | 2006-288012 | 10/2006 |
| JP | 2006-353090 | 12/2006 |
| JP | 2007-116837 | 5/2007 |
| JP | 2008-017543 | 1/2008 |
| JP | 2008-043138 | 2/2008 |
| JP | 2008-67592 | 3/2008 |

* cited by examiner

Primary Examiner — Dang Le
(74) Attorney, Agent, or Firm — Squire Sanders (US) LLP

(57) ABSTRACT

An electric motor 1 includes a first structure 4 including a magnetic pole row formed by a predetermined plurality of magnetic poles 4a arranged in a predetermined direction, a second structure 3 including an armature row disposed in a manner opposed to the magnetic pole row, for generating moving magnetic fields moving in the predetermined direction between the armature row and the magnetic pole row, and a third structure 5 including a soft magnetic material element row. The third structure disposed such that the soft magnetic material element row is positioned between the magnetic pole row and the armature row. A ratio between the number of the armature magnetic poles, the number of the magnetic poles 4a, and the number of the soft magnetic material elements 5a is set to 1:m:(1+m)/2 (m≠1.0).

6 Claims, 16 Drawing Sheets

F I G. 1
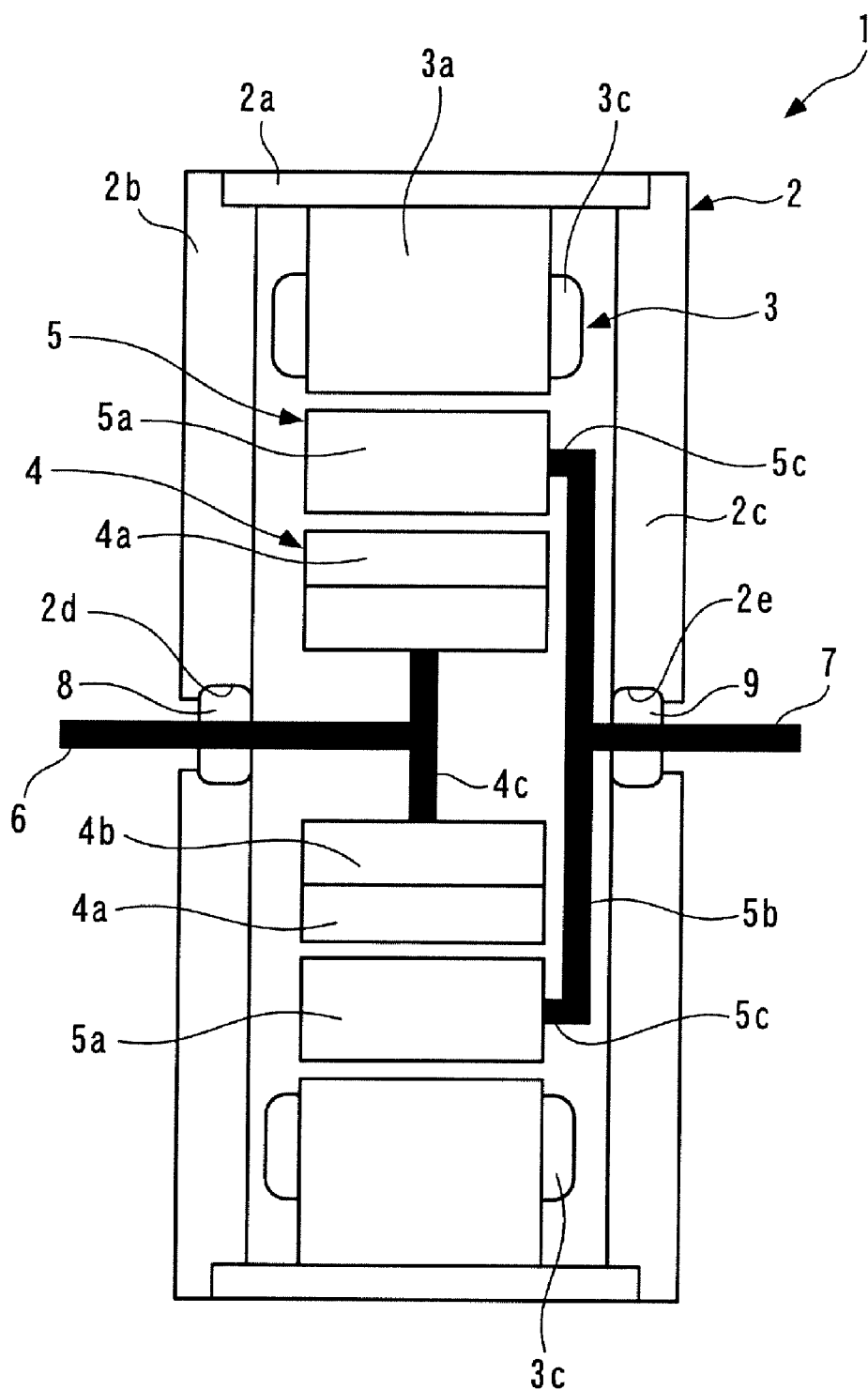

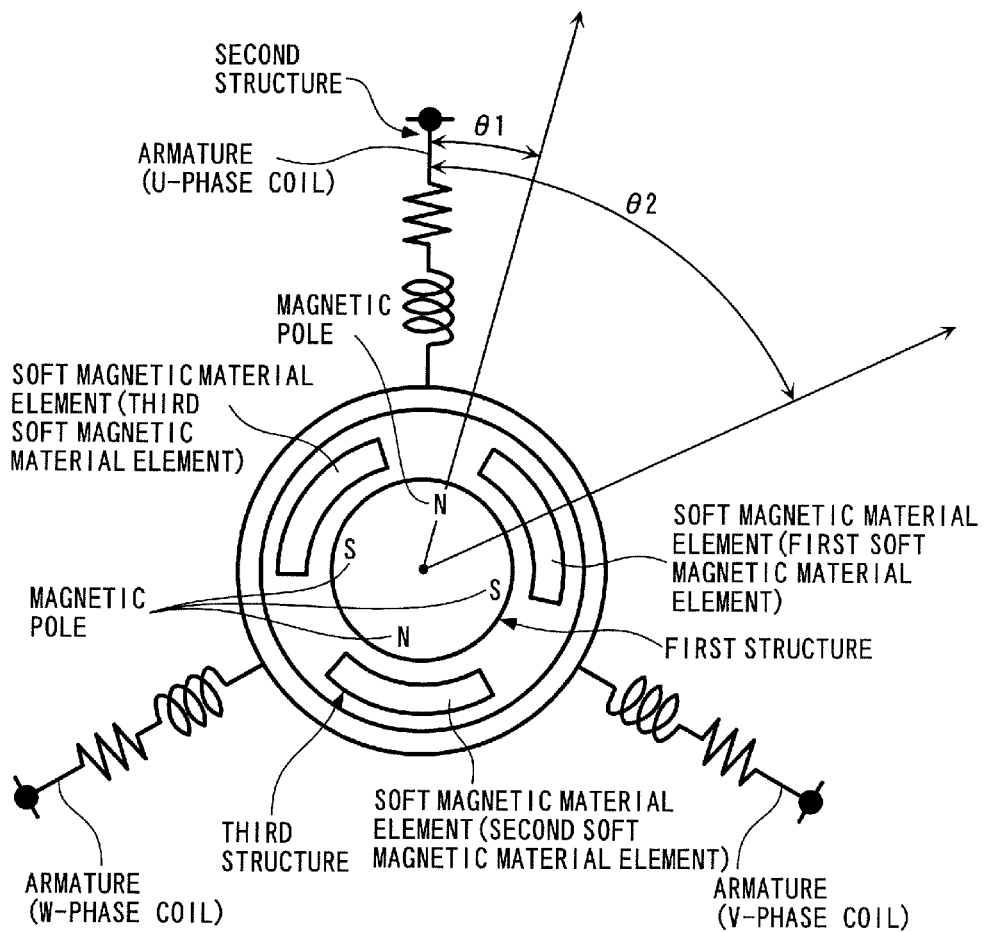
F I G. 1 9

ELECTRIC MOTOR

FIELD OF THE INVENTION

The present invention relates to an electric motor that includes a plurality of movable elements or stators, and converts supplied electric power to power for outputting the power from the movable elements.

BACKGROUND ART

Conventionally, as an electric motor of this kind, one disclosed in Patent Literature 1 is known. The electric motor is a so-called rotating machine, and includes a first rotor and a second rotor which are connected to a first rotating shaft and a second rotating shaft, respectively, and a single stator. The first and second rotating shafts are arranged concentrically with each other, while the first rotor, the second rotor and the stator are arranged in the direction of radius of the first rotating shaft from inside in the mentioned order.

The first rotor includes a plurality of first permanent magnets and second permanent magnets which are arranged in the circumferential direction, respectively. The first and second permanent magnets are arranged in parallel with each other in the direction of axis of the first rotor. The stator is configured to generate a first rotating magnetic field and a second rotating magnetic field which rotate in the circumferential direction. The first rotating magnetic field is generated between the stator and a portion of the first rotor toward the first permanent magnets, and the second rotating magnetic field is generated between the stator and a portion of the first rotor toward the second permanent magnets. The second rotor includes a plurality of first cores and second cores which are arranged in the circumferential direction, respectively. These first and second cores are comprised of soft magnetic material elements. The first cores are arranged between a portion of the first rotor toward the first permanent magnets and the stator, and the second cores are arranged between a portion of the first rotor toward the second permanent magnets and the stator. The numbers of the magnetic poles of the first and second permanent magnets, the numbers of the magnetic poles of the first and second rotating magnetic fields, and the numbers of the first and second cores are set to be equal to each other, respectively.

In the electric motor arranged as described above, as the first and second rotating magnetic fields are generated by the supply of electric power to the stator, the first and second cores are magnetized by the magnetic poles of the first and second rotating magnetic fields and the magnetic poles of the first and second permanent magnets, whereby magnetic force lines are generated between these elements. Further, the first and second rotors are driven by action caused by the magnetic forces of the magnetic force lines, and in turn power is output from the first and second rotating shafts.

In the above-described conventional electric motor, due to the arrangement thereof, to cause the magnetic forces of the magnetic force lines to properly act so as to convert electric power supplied to the stator to power and output the power from the first and second rotating shafts, not only a first soft magnetic material element row comprised of the plurality of first cores but also a second soft magnetic material element row comprised of the plurality of second cores are indispensable, and it is inevitable to result in an increase in the size of the electric motor, and an increase in the manufacturing costs thereof. Further, due to the arrangement thereof, the electric motor is only possible when there holds speed relationship in which the difference between the rotational speed of the first and second rotating magnetic fields and the rotational speed of the second rotor, and the difference between the rotational speed of the second rotor and the rotational speed of the first rotor become equal to each other. This degrades the degree of freedom in design of the electric motor.

The present invention has been made to provide a solution to the above-described problems, and an object thereof is to provide an electric motor which is capable of reducing the size and manufacturing costs thereof while enhancing the degree of freedom in design of the same.

[Patent Literature 1]
Japanese Laid-Open Patent Publication (Kokai) No. 2008-67592.

DISCLOSURE OF THE INVENTION

To attain the object, the invention as claimed in claim 1 provides an electric motor 1, 31, comprising a first structure (first rotor 4, first rotating shaft 6, second stator 34) including a magnetic pole row, the magnetic pole row being formed by a predetermined plurality of magnetic poles (permanent magnets 4a, 34a) arranged in a predetermined direction, and having each two adjacent magnetic poles so disposed as to have polarities different from each other, a second structure (stator 3, first stator 33) including an armature row, the armature row being formed by a plurality of armatures (iron core 3a, U-phase to W-phase coils 3c to 3e, iron core 33a, U-phase to W-phase coils 33c to 33e) arranged in the predetermined direction, and being disposed in a manner opposed to the magnetic pole row, for generating moving magnetic fields moving in the predetermined direction between the armature row and the magnetic pole row by a predetermined plurality of armature magnetic poles generated at the plurality of armatures in accordance with supply of electric power thereto, and a third structure (second rotor 5, second rotating shaft 7, movable element 35) including a soft magnetic material element row, the soft magnetic material element row being formed by a predetermined plurality of soft magnetic material elements (cores 5a, cores 35b) arranged in the predetermined direction in a manner spaced from each other, and being disposed such that the soft magnetic material element row is positioned between the magnetic pole row and the armature row, wherein a ratio between a number of the armature magnetic poles, a number of the magnetic poles, and a number of the soft magnetic material elements, within a predetermined section along the predetermined direction is set to 1:m:(1+m)/2 (m≠1.0).

According to this electric motor, the magnetic pole row of the first structure and the armature row of the second structure are arranged in a manner opposed to each other, and the soft magnetic material element row of the third structure is disposed such that it is positioned between the magnetic pole row and the armature row. The plurality of magnetic poles, armatures, and soft magnetic material elements, which form the magnetic pole row, the armature row, and the soft magnetic material element row, respectively, are arranged in the predetermined direction. Further, the plurality of armature magnetic poles are generated in accordance with supply of electric power to the armature row, and the moving magnetic fields are generated between the armature row and the magnetic pole row by the armature magnetic poles, and move in the predetermined direction. Furthermore, each two adjacent magnetic poles have polarities different from each other, and each two adjacent soft magnetic material elements are spaced from each other. As described above, between the magnetic pole row and the armature row, the moving magnetic fields by the plurality of armature magnetic poles are generated, and the soft magnetic material element row is disposed, whereby the soft magnetic material elements are magnetized by the armature magnetic poles and the magnetic poles. Because of this and the fact that each two adjacent soft magnetic material elements are spaced from each other, there are generated magnetic force lines in a manner connecting between the magnetic poles, the soft magnetic material elements, and the armature magnetic poles. Further, magnetic forces caused by the magnetic force lines act to convert the electric power supplied to the armatures to power, and the power is output from the first structure, the second structure, and the third structure.

In this case, for example, when the electric motor according to the present invention is constructed under the following conditions (a) and (b), there are represented the speed relationship between the moving magnetic fields and the first and third structures, and the torque relationship between the first to third structures as mentioned below. Further, an equivalent circuit corresponding to the electric motor is expressed as shown in FIG. 19.

(a) The electric motor is a rotating machine, and the armatures have three-phase coils of U-phase, V-phase, and W-phase.

(b) The number of the armature magnetic poles is 2, and the number of the magnetic poles is 4, that is, a pole pair number, in which an N pole and an S pole form one pair, of the armature magnetic poles, has a value of 1, a pole pair number, in which an N pole and an S pole form one pair, of the magnetic poles, has a value of 2, and the number of the soft magnetic material elements is 3.

It should be noted that as described above, throughout the specification, the term "pole pair" is intended to mean a pair of a N pole and a S pole.

In this case, a magnetic flux $\Psi k1$ of a magnetic pole passing through a first soft magnetic material element of the soft magnetic material elements is expressed by the following equation (1):

$$\Psi k1 = \psi f \cos[2(\theta 2 - \theta 1)] \tag{1}$$

wherein $\psi f$ represents the maximum value of the magnetic flux of the magnetic pole, and $\theta 1$ and $\theta 2$ represent a rotational angular position of the magnetic pole and a rotational angular position of the soft magnetic material element, with respect to the U-phase coil. Further, in this case, since the ratio of the pole pair number of the magnetic poles to the pole pair number of the armature magnetic poles is 2.0, the magnetic flux of the magnetic pole rotates (changes) at a repetition period of the twofold of the repetition period of the moving magnetic fields, so that in the above-mentioned equation (1), to indicate this fact, $(\theta 2 - \theta 1)$ is multiplied by 2.0.

Therefore, a magnetic flux $\Psi u1$ of a magnetic pole passing through the U-phase coil via the first soft magnetic material element is expressed by the following equation (2) obtained by multiplying the equation (1) by $\cos \theta 2$.

$$\Psi u1 = \psi f \cos[2(\theta 2 - \theta 1)] \cos \theta 2 \tag{2}$$

Similarly, a magnetic flux $\Psi k2$ of a magnetic pole passing through a second soft magnetic material element of the soft magnetic material elements is expressed by the following equation (3):

$$\Psi k2 = \psi f \cdot \cos\left[2\left(\theta 2 + \frac{2\pi}{3} - \theta 1\right)\right] \tag{3}$$

The rotational angular position of the second soft magnetic material element with respect to the armature leads that of the first soft magnetic material element by $2\pi/3$, so that in the above-mentioned equation (3), to indicate this fact, $2\pi/3$ is added to $\theta 2$.

Therefore, a magnetic flux $\Psi u2$ of a magnetic pole passing through the U-phase coil via the second soft magnetic material element is expressed by the following equation (4) obtained by multiplying the equation (3) by $\cos(\theta 2 + 2\pi/3)$.

$$\Psi u2 = \psi f \cdot \cos\left[2\left(\theta 2 + \frac{2\pi}{3} - \theta 1\right)\right] \cos\left(\theta 2 + \frac{2\pi}{3}\right) \tag{4}$$

Similarly, a magnetic flux $\Psi u3$ of a magnetic pole passing through the U-phase coil via a third soft magnetic material element of the soft magnetic material elements is expressed by the following equation (5):

$$\Psi u3 = \psi f \cdot \cos\left[2\left(\theta 2 + \frac{4\pi}{3} - \theta 1\right)\right] \cos\left(\theta 2 + \frac{4\pi}{3}\right) \tag{5}$$

In the electric motor as shown in FIG. 19, a magnetic flux $\Psi u$ of the magnetic pole passing through the U-phase coil via the soft magnetic material elements is obtained by adding $\Psi u1$ to $\Psi u3$ expressed by the above-described equations (2), (4) and (5), and hence the magnetic flux $\Psi u$ is expressed by the following equation (6):

$$\Psi u = \tag{6}$$
$$\psi f \cdot \cos[2(\theta 2 - \theta 1)] \cos \theta 2 + \psi f \cdot \cos\left[2\left(\theta 2 + \frac{2\pi}{3} - \theta 1\right)\right] \cos\left(\theta 2 + \frac{2\pi}{3}\right) +$$
$$\psi f \cdot \cos\left[2\left(\theta 2 + \frac{4\pi}{3} - \theta 1\right)\right] \cos\left(\theta 2 + \frac{4\pi}{3}\right)$$

Further, when this equation (6) is generalized, the magnetic flux $\Psi u$ of the magnetic pole passing through the U-phase coil via the soft magnetic material elements is expressed by the following equation (7):

$$\Psi u = \sum_{i=1}^{b} \psi f \cdot \cos\left\{a\left[\theta 2 + (i-1)\frac{2\pi}{b} - \theta 1\right]\right\} \cos\left\{c\left[\theta 2 + (i-1)\frac{2\pi}{b}\right]\right\} \tag{7}$$

wherein a, b and c represent the pole pair number of the magnetic poles, the number of the soft magnetic material elements, and the pole pair number of the armature magnetic poles.

Further, when the above equation (7) is changed based on the formula of the sum and product of the trigonometric function, there is obtained the following equation (8):

$$\Psi u = \sum_{i=1}^{b} \frac{1}{2} \cdot \psi f \left\{ \cos\left[\begin{array}{c}(a+c)\theta 2 - a \cdot \theta 1 + \\ (a+c)(i-1)\frac{2\pi}{b}\end{array}\right] + \cos\left[\begin{array}{c}(a-c)\theta 2 - a \cdot \theta 1 + \\ (a-c)(i-1)\frac{2\pi}{b}\end{array}\right] \right\} \tag{8}$$

When this equation (8) is arranged by setting b=a+c, and $\cos(\theta+2\pi)=\cos\theta$, there is obtained the following equation (9):

$$\Psi u = \frac{b}{2} \cdot \psi f \cdot \cos[(a+c)\theta 2 - a \cdot \theta 1] + \qquad (9)$$

$$\sum_{i=1}^{b} \frac{1}{2} \cdot \psi f \left\{ \cos\left[ \begin{array}{c} (a-c)\theta 2 - a \cdot \theta 1 + \\ (a-c)(i-1)\frac{2\pi}{b} \end{array} \right] \right\}$$

When this equation is arranged based on the addition theorem of the trigonometric function, there is obtained the following equation (10):

$$\Psi u = \frac{b}{2} \cdot \psi f \cdot \cos[(a+c)\theta 2 - a \cdot \theta 1] + \qquad (10)$$

$$\frac{1}{2} \cdot \psi f \cdot \cos[(a-c)\theta 2 - a \cdot \theta 1] \sum_{i=1}^{b} \cos\left[(a-c)(i-1)\frac{2\pi}{b}\right] -$$

$$\frac{1}{2} \cdot \psi f \cdot \sin[(a-c)\theta 2 - a \cdot \theta 1] \sum_{i=1}^{b} \sin\left[(a-c)(i-1)\frac{2\pi}{b}\right]$$

When the second term on the right side of the equation (10) is arranged based on the sum total of the series and the Euler's formula on condition that a−c≠0, the second term becomes equal to 0, as expressed by the following equation (11):

$$\sum_{i=1}^{b} \cos\left[(a-c)(i-1)\frac{2\pi}{b}\right] = \sum_{i=0}^{b-1} \frac{1}{2} \left\{ \begin{array}{c} e^{j[(a-c)\frac{2\pi}{b}i]} + \\ e^{-j[(a-c)\frac{2\pi}{b}i]} \end{array} \right\} \qquad (11)$$

$$= \frac{1}{2} \left\{ \begin{array}{c} \frac{e^{j[(a-c)\frac{2\pi}{b}b]} - 1}{e^{j[(a-c)\frac{2\pi}{b}]} - 1} + \\ \frac{e^{-j[(a-c)\frac{2\pi}{b}b]} - 1}{e^{-j[(a-c)\frac{2\pi}{b}]} - 1} \end{array} \right\}$$

$$= \frac{1}{2} \left\{ \begin{array}{c} \frac{e^{j[(a-c)2\pi]} - 1}{e^{j[(a-c)\frac{2\pi}{b}]} - 1} + \\ \frac{e^{-j[(a-c)2\pi]} - 1}{e^{-j[(a-c)\frac{2\pi}{b}]} - 1} \end{array} \right\}$$

$$= \frac{1}{2} \left\{ \begin{array}{c} \frac{0}{e^{j[(a-c)\frac{2\pi}{b}]} - 1} + \\ \frac{0}{e^{-j[(a-c)\frac{2\pi}{b}]} - 1} \end{array} \right\}$$

$$= 0$$

Further, when the third term on the right side of the above-described equation (10) is arranged based on the sum total of the series and the Euler's formula on condition that a−c≠0, the third term as well becomes equal to 0, as expressed by the following equation (12):

$$\sum_{i=1}^{b} \sin\left[(a-c)(i-1)\frac{2\pi}{b}\right] = \sum_{i=0}^{b-1} \frac{1}{2} \left\{ \begin{array}{c} e^{j[(a-c)\frac{2\pi}{b}i]} - \\ e^{-j[(a-c)\frac{2\pi}{b}i]} \end{array} \right\} \qquad (12)$$

$$= \frac{1}{2} \left\{ \begin{array}{c} \frac{e^{j[(a-c)\frac{2\pi}{b}b]} - 1}{e^{j[(a-c)\frac{2\pi}{b}]} - 1} - \\ \frac{e^{-j[(a-c)\frac{2\pi}{b}b]} - 1}{e^{-j[(a-c)\frac{2\pi}{b}]} - 1} \end{array} \right\}$$

$$= \frac{1}{2} \left\{ \begin{array}{c} \frac{e^{j[(a-c)2\pi]} - 1}{e^{j[(a-c)\frac{2\pi}{b}]} - 1} - \\ \frac{e^{-j[(a-c)2\pi]} - 1}{e^{-j[(a-c)\frac{2\pi}{b}]} - 1} \end{array} \right\}$$

$$= \frac{1}{2} \left\{ \begin{array}{c} \frac{0}{e^{j[(a-c)\frac{2\pi}{b}]} - 1} - \\ \frac{0}{e^{-j[(a-c)\frac{2\pi}{b}]} - 1} \end{array} \right\}$$

$$= 0$$

From the above, when a−c≠0 holds, the magnetic flux $\Psi u$ of the magnetic pole passing through the U-phase coil via the soft magnetic material elements is expressed by the following equation (13):

$$\Psi u = \frac{b}{2} \cdot \psi f \cdot \cos[(a+c)\theta 2 - a \cdot \theta 1] \qquad (13)$$

Further, in this equation (13), if a/c=α holds, there is obtained the following equation (14):

$$\Psi u = \frac{b}{2} \cdot \psi f \cdot \cos[(\alpha + 1)c \cdot \theta 2 - \alpha \cdot c \cdot \theta 1] \qquad (14)$$

Furthermore, in this equation (14), if c·θ2=θe2 and c·θ1=θe1 hold, there is obtained the following equation (15):

$$\Psi u = \frac{b}{2} \cdot \psi f \cdot \cos[(\alpha + 1)\theta e2 - \alpha \cdot \theta e1] \qquad (15)$$

In this equation, as is clear from the fact that θe2 is obtained by multiplying the rotational angular position θ2 of the soft magnetic material element with respect to the U-phase coil by the pole pair number c of the armature magnetic poles, θe2 represents the electrical angular position of the soft magnetic material element with respect to the U-phase coil. Further, as is clear from the fact that θe1 is obtained by multiplying the rotational angular position θ1 of the magnetic pole with respect to the U-phase coil by the pole pair number c of the armature magnetic poles, θe1 represents the electrical angular position of the magnetic pole with respect to the U-phase coil.

Similarly, since the electrical angular position of the V-phase coil leads that of the U-phase coil by the electrical angle 2π/3, the magnetic flux $\Psi v$ of the magnetic pole passing through the V-phase coil via the soft magnetic material elements is expressed by the following equation (16). Further, since the electrical angular position of the W-phase coil leads that of the U-phase coil by the electrical angle 2π/3, the magnetic flux $\Psi w$ of the magnetic pole passing through the W-phase coil via the soft magnetic material elements is expressed by the following equation (17):

$$\Psi v = \frac{b}{2} \cdot \psi f \cdot \cos\left[(\alpha+1)\theta e2 - \alpha \cdot \theta e1 - \frac{2\pi}{3}\right] \quad (16)$$

$$\Psi w = \frac{b}{2} \cdot \psi f \cdot \cos\left[(\alpha+1)\theta e2 - \alpha \cdot \theta e1 + \frac{2\pi}{3}\right] \quad (17)$$

Further, when the magnetic fluxes $\Psi u$ to $\Psi w$ expressed by the above-mentioned equations (15) to (17), respectively, is differentiated with respect to time, the following equations (18) to (20) are obtained:

$$\frac{d\Psi u}{dt} = -\frac{b}{2} \cdot \psi f \left\{ \begin{array}{l} [(\alpha+1)\omega e2 - \alpha \cdot \omega e1]\sin \\ [(\alpha+1)\theta e2 - \alpha \cdot \theta e1] \end{array} \right\} \quad (18)$$

$$\frac{d\Psi v}{dt} = -\frac{b}{2} \cdot \psi f \left\{ \begin{array}{l} [(\alpha+1)\omega e2 - \alpha \cdot \omega e1]\sin \\ \left[(\alpha+1)\theta e2 - \alpha \cdot \theta e1 - \frac{2\pi}{3}\right] \end{array} \right\} \quad (19)$$

$$\frac{d\Psi w}{dt} = -\frac{b}{2} \cdot \psi f \left\{ \begin{array}{l} [(\alpha+1)\omega e2 - \alpha \cdot \omega e1]\sin \\ \left[(\alpha+1)\theta e2 - \alpha \cdot \theta e1 + \frac{2\pi}{3}\right] \end{array} \right\} \quad (20)$$

wherein $\omega e1$ denotes a value obtained by differentiating $\theta e1$ with respect to time, i.e. a value obtained by converting the angular velocity of the first structure with respect to the second structure to an electrical angular velocity, and $\omega e2$ denotes a value obtained by differentiating $\theta e2$ with respect to time, i.e. a value obtained by converting the angular velocity of the third structure with respect to the second structure to an electrical angular velocity.

Further, magnetic fluxes that directly pass through the U-phase to W-phase coils without via the soft magnetic material elements are very small, and hence influence thereof is negligible. Therefore, $d\Psi u/dt$ to $d\Psi w/dt$, which are values obtained by differentiating, with respect to time, the magnetic fluxes $\Psi u$ to $\Psi w$ (equations (18) to (20)) of the magnetic poles, which pass through the U-phase to W-phase coils via the soft magnetic material elements, respectively, represent counter-electromotive force voltages (induced electromotive voltages), which are generated in the U-phase to W-phase coils as the magnetic poles and the soft magnetic material elements rotate (move) with respect to the armature row.

From the above, electric currents Iu, Iv and Iw, flowing through the U-phase, V-phase and W-phase coils, respectively, are expressed by the following equations (21), (22) and (23):

$$Iu = I \cdot \sin[(\alpha+1)\theta e2 - \alpha \cdot \theta e1] \quad (21)$$

$$Iv = I \cdot \sin\left[(\alpha+1)\theta e2 - \alpha \cdot \theta e1 - \frac{2\pi}{3}\right] \quad (22)$$

$$Iw = I \cdot \sin\left[(\alpha+1)\theta e2 - \alpha \cdot \theta e1 + \frac{2\pi}{3}\right] \quad (23)$$

wherein I represents the amplitude (maximum value) of each electric current flowing through the U-phase to W-phase coils.

Further, from the above equations (21) to (23), the electrical angular position $\theta mf$ of the vector of a moving magnetic field (rotating magnetic field) with respect to the U-phase coil is expressed by the following equation (24), and the electrical angular velocity $\omega mf$ of the moving magnetic field with respect to U-phase coil is expressed by the following equation (25):

$$\theta mf = (\alpha+1)\theta e2 - \alpha \cdot \theta e1 \quad (24)$$

$$\omega mf = (\alpha+1)\omega e2 - \alpha \cdot \omega e1 \quad (25)$$

Further, in a case where the armature row as well as the second structure is configured to be immovable, the mechanical output (power) W, which is output to the first and third structures by the flowing of the currents Iu to Iw through the U-phase to W-phase coils, is represented, provided that an reluctance-associated portion is excluded therefrom, by the following equation (26):

$$W = \frac{d\Psi u}{dt} \cdot Iu + \frac{d\Psi v}{dt} \cdot Iv + \frac{d\Psi w}{dt} \cdot Iw \quad (26)$$

When the equations (18) to (23) are substituted into this equation (26) for arrangement, there is obtained the following equation (27):

$$W = -\frac{3 \cdot b}{4} \cdot \psi f \cdot I[(\alpha+1)\omega e2 - \alpha \cdot \omega e1] \quad (27)$$

Furthermore, the relationship between this mechanical output W, torque T1 transmitted to the first structure via the magnetic poles (hereinafter referred to as "the first torque T1"), torque T2 transmitted to the third structure via the soft magnetic material elements (hereinafter referred to as "the second torque T2"), the electrical angular velocity $\omega e1$ of the first structure, and the electrical angular velocity $\omega e2$ of the third structure is expressed by the following equation (28):

$$W = T1 \cdot \omega e1 + T2 \cdot \omega e2 \quad (28)$$

As is clear from the above equations (27) and (28), the first and second torques T1 and T2 are expressed by the following equations (29) and (30):

$$T1 = \alpha \cdot \frac{3 \cdot b}{4} \cdot \psi f \cdot I \quad (29)$$

$$T2 = -(\alpha+1) \cdot \frac{3 \cdot b}{4} \cdot \psi f \cdot I \quad (30)$$

Further, when torque equivalent to electric power supplied to the armature row and the electrical angular velocity $\omega mf$ of the moving magnetic field is defined as driving equivalent torque Te, since the electric power supplied to the armature row and the mechanical output W are equal to each other (provided that losses are ignored), from the equation (28), the driving equivalent torque Te is expressed by the following equation (31):

$$Te = \frac{3 \cdot b}{4} \cdot \psi f \cdot I \quad (31)$$

Further, by using the above equations (29) to (31), there is obtained the following equation (32):

$$Te = \frac{T1}{\alpha} = \frac{-T2}{(\alpha+1)} \quad (32)$$

The relationship between the torques, expressed by the equation (32), and the relationship between the electrical angular velocities, expressed by the above-mentioned equation (25), are quite the same as the relationship between the rotational speeds and the relationship between the torques in the sun gear, the ring gear and the carrier of a planetary gear unit. Further, such relationship between the electrical angular velocities and relationship between the torques hold not only in the above-described case where the second structure is configured to be immovable but also under all the conditions concerning movabilities of the first to third structures. For example, the above relationships hold also when the second structure is not configured to be immovable and electric power is supplied in a state where power is input to the second structure, when the first or third structure is configured to be immovable in addition to the second structure, and when electric power is supplied to the armature row in a state where power is input to the first or third structure. Further, these relationships hold also when the second structure is configured to be movable, and at the same time the first and/or third structure(s) are/is configured to be immovable or when electric power is supplied in a state where power is input to the first and/or third structure(s).

Further, as described above, on condition that b=a+c and a−c≠0 hold, the relationship between the electrical angular velocities, expressed by the equation (25), and the relationship between the torques, expressed by the equation (32), hold. The above condition b=a+c is expressed by b=(p+q)/2, i.e. b/q=(1+p/q)/2, assuming that the number of the magnetic poles is p and that of the armature magnetic poles is q. Here, as is clear from the fact that if p/q=m holds, b/q=(1+m)/2 is obtained, the satisfaction of the above condition of b=a+c represents that the ratio between the number of the armature magnetic poles, the number of the magnetic poles, and the number of the soft magnetic material elements is 1:m:(1+m)/2. Further, the satisfaction of the above condition of a−c≠0 represents that m≠1.0 holds. According to the electric motor of the present invention, in the predetermined section in the predetermined direction, the ratio between the number of the armature magnetic poles, the number of the magnetic poles, and the number of the soft magnetic material elements is set to 1:m:(1+m)/2 (m≠1.0), and hence the relationship between the electrical angular velocities, expressed by the equation (25), and the relationship between the torques, expressed by the equation (32), hold, from which it is understood that the electric motor properly operates.

Further, differently from the aforementioned conventional case, the electric motor can be operated by the single soft magnetic material element row alone, and hence it is possible to reduce the size and manufacturing costs of the electric motor. Furthermore, as is clear from the equations (25) and (32), by setting α=a/c, i.e. the ratio of the pole pair number of the magnetic poles to the pole pair number of the armature magnetic poles, it is possible to freely set the relationship between the electrical angular velocities of the moving magnetic fields and the second and third structures, and the relationship between the torques of the first to third structures, and hence it is possible to enhance the degree of freedom in design of the electric motor. The same advantageous effects can be obtained also when the number of phases of coils of the plurality of armatures is other than the aforementioned 3, and also when the electric motor is not the rotating machine but a linear motor. It is to be understood that when the electric motor is a linear motor, the relationship not between "torques" but between "thrusts" can be freely set The invention as claimed in claim 2 is the electric motor 1, 31 as claimed in claim 1, further comprising relative positional relationship-detecting means (first rotational position sensor 21, second rotational position sensor 22, electrical angle converter 16b, position sensor 41) for detecting a relative positional relationship between the first to third structures, and control means (ECU 16) for controlling the moving magnetic fields based on the detected relative positional relationship between the first to third structures.

With this arrangement, the relative positional relationship-detecting means detects the relative positional relationship between the first to third structures, and the control means controls the moving magnetic fields based on the detected relative positional relationship between the first to third structures. This makes it possible to properly generate magnetic force lines between the magnetic poles, the soft magnetic material elements, and the armature magnetic poles, to thereby cause magnetic forces by the magnetic force lines to act. Therefore, it is possible to ensure the proper operation of the electric motor.

The invention as claimed in claim 3 is the electric motor 1, 31 as claimed in claim 2, wherein the relative positional relationship-detecting means (first rotational position sensor 21, second rotational position sensor 22, electrical angle converter 16b) detects electrical angular positions of the first structure and the third structure with respect to the second structure, respectively, as the relative positional relationship between the first to third structures, and wherein the control means controls the moving magnetic fields based on a difference between a value obtained by multiplying the detected electrical angular position (second rotor electrical angle θER2) of the third structure by (1+m), and a value obtained by multiplying the detected electrical angular position (first rotor electrical angle θER1) of the first structure by m.

With this arrangement, the moving magnetic fields are controlled based on the difference between the value obtained by multiplying the detected electrical angular position of the third structure with respect to the second structure by (1+m), and the value obtained by multiplying the detected electrical angular position of the first structure with respect to the second structure by m. As is clear from claim 1, m represents the ratio of the number of the magnetic poles to the number of the armature magnetic poles. Further, as described hereinabove as to the operation of claim 1, when the electric motor is in operation, the relationship between the electrical angular position of the moving the moving magnetic fields and the electrical angular positions of the second and third structures is expressed by the equation (24). In the equation (24), α represents the ratio (a/c) of the pole pair number of the magnetic poles to the pole pair number of the armature magnetic poles, that is, the ratio of the number of the magnetic poles to the number of the armature magnetic poles, which is equal to m. Therefore, with the above-described arrangement, it is possible to ensure a more proper operation of the electric motor.

The invention as claimed in claim 4 is the electric motor 1, 31 as claimed in any one of claims 1 to 3, wherein the magnetic poles are magnetic poles of permanent magnets 4a, 34a.

With this arrangement, the magnetic poles of the permanent magnets are used as magnetic poles, and hence differently from the case where the magnetic poles of electromagnets are used, it is possible to dispense with electric circuits and coils for supplying electric power to the electromagnets. This makes it possible to further reduce the size of the electric motor to simplify the construction thereof. Further, for example, when the first structure having magnetic poles is configured to be rotatable, it is possible to dispense with a slip ring for supplying electric power to electromagnets when the magnetic poles of the electromagnets are used as the magnetic poles, thereby making it possible to downsize the electric motor and increase efficiency thereof.

The invention as claimed in claim 5 is the electric motor 1 as claimed in claim 1, wherein the electric motor is a rotating machine.

With this arrangement, it is possible to obtain the advantageous effects as described concerning claim 1, for a rotating machine.

The invention as claimed in claim 6 is the electric motor 31 as claimed in claim 1, wherein the electric motor is a linear motor.

With this arrangement, it is possible to obtain the advantageous effects as described concerning claim 1, for a linear motor.

BRIEF DESCRIPTION OF THE DRAWINGS

FIG. 1 A schematic cross-sectional view of an electric motor according to a first embodiment of the present invention.

FIG. 19 A diagram showing an equivalent circuit of the electric motor according to the present invention.

BEST MODE FOR CARRYING OUT THE INVENTION

Figure 2:
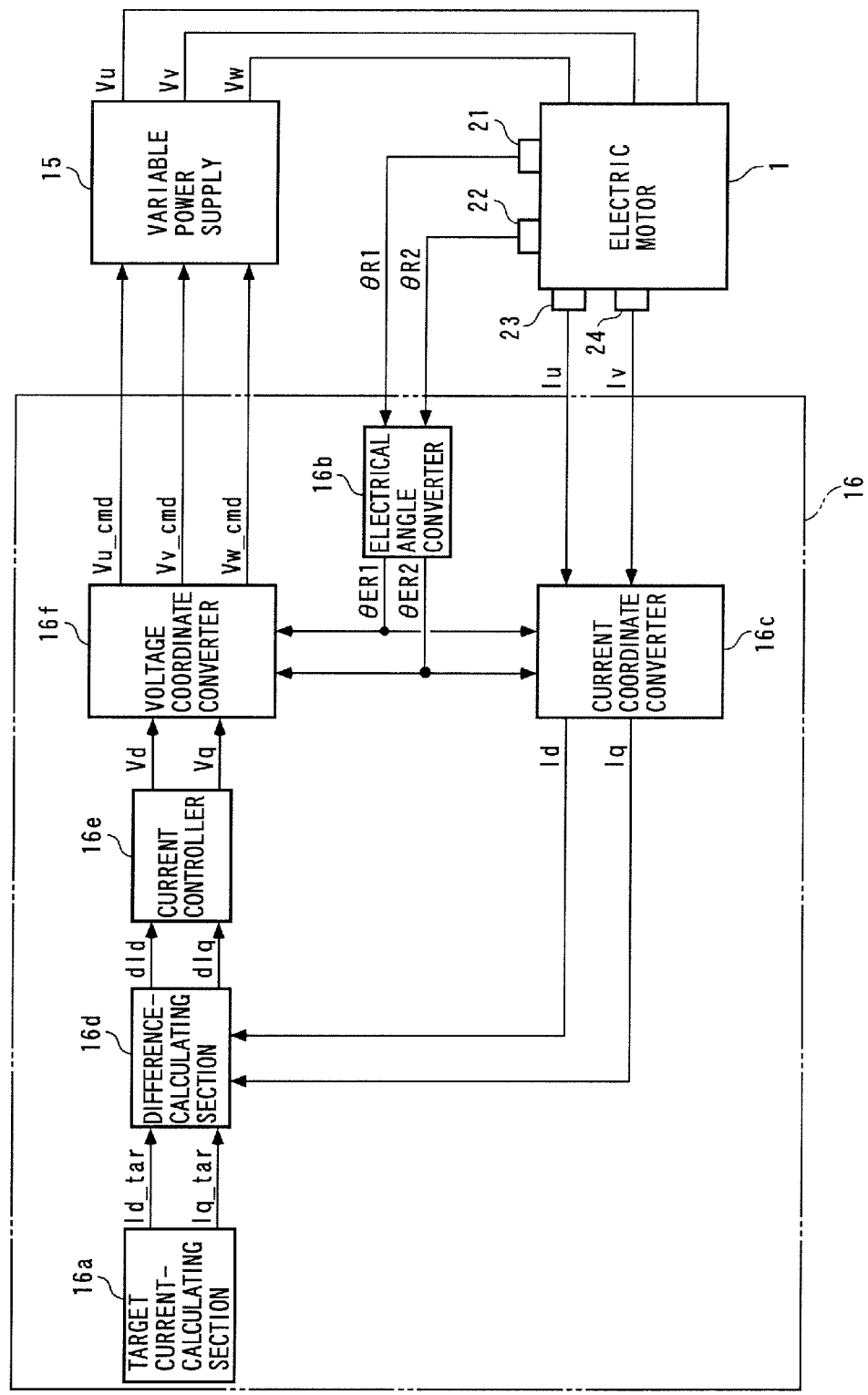
FIG. 2 A block diagram showing the electric motor in FIG. 1 and an ECU.

The present invention will now be described in detail with reference to the drawings showing a preferred embodiment thereof. FIG. 1 shows an electric motor 1 according to a first embodiment of the present invention. The electric motor 1 is configured to be a rotating machine, operations of which are controlled by an ECU 16 shown in FIG. 2. Referring to FIG. 1, the electric motor 1 is comprised of an immovable casing 2, a stator 3 disposed within the casing 2, a first rotor 4 disposed within the casing 2 in a manner opposed to the stator 3, a second rotor 5 disposed between the two 3 and 4, a first rotating shaft 6 and a second rotating shaft 7. It should be noted that in FIG. 1, some of the elements, such as the first rotating shaft 6 and the like, are illustrated in a skeleton diagram-like manner for convenience of illustration. Further, in FIG. 1 and other figures, referred to hereinafter, hatching in portions illustrating cross-sections are omitted.

The casing 2 includes a hollow cylindrical peripheral wall 2a and a pair of disk-shaped side walls 2b and 2c arranged on opposite ends of the peripheral wall 2a, which are integrally formed with each other. The side walls 2b and 2c have fitting holes 2d and 2e in the respective centers thereof, and bearing 8 and 9 are fitted in the fitting holes 2d and 2e, respectively.

The above-described first and second rotating shafts 6 and 7 are rotatably supported by the bearings 8 and 9, respectively, and are arranged concentrically with each other. Further, the first and second rotating shafts 6 and 7 each have a portion thereof accommodated in the casing 2, and the remainder thereof extending outward from the casing 2. Furthermore, the above-mentioned stator 3, second rotor 3 and first rotor 4 are arranged concentrically with each other in the direction of radius of the first rotating shaft 6 (hereinafter imply referred to as "in the radial direction or radially") from outside in the mentioned order.

Figure 3:
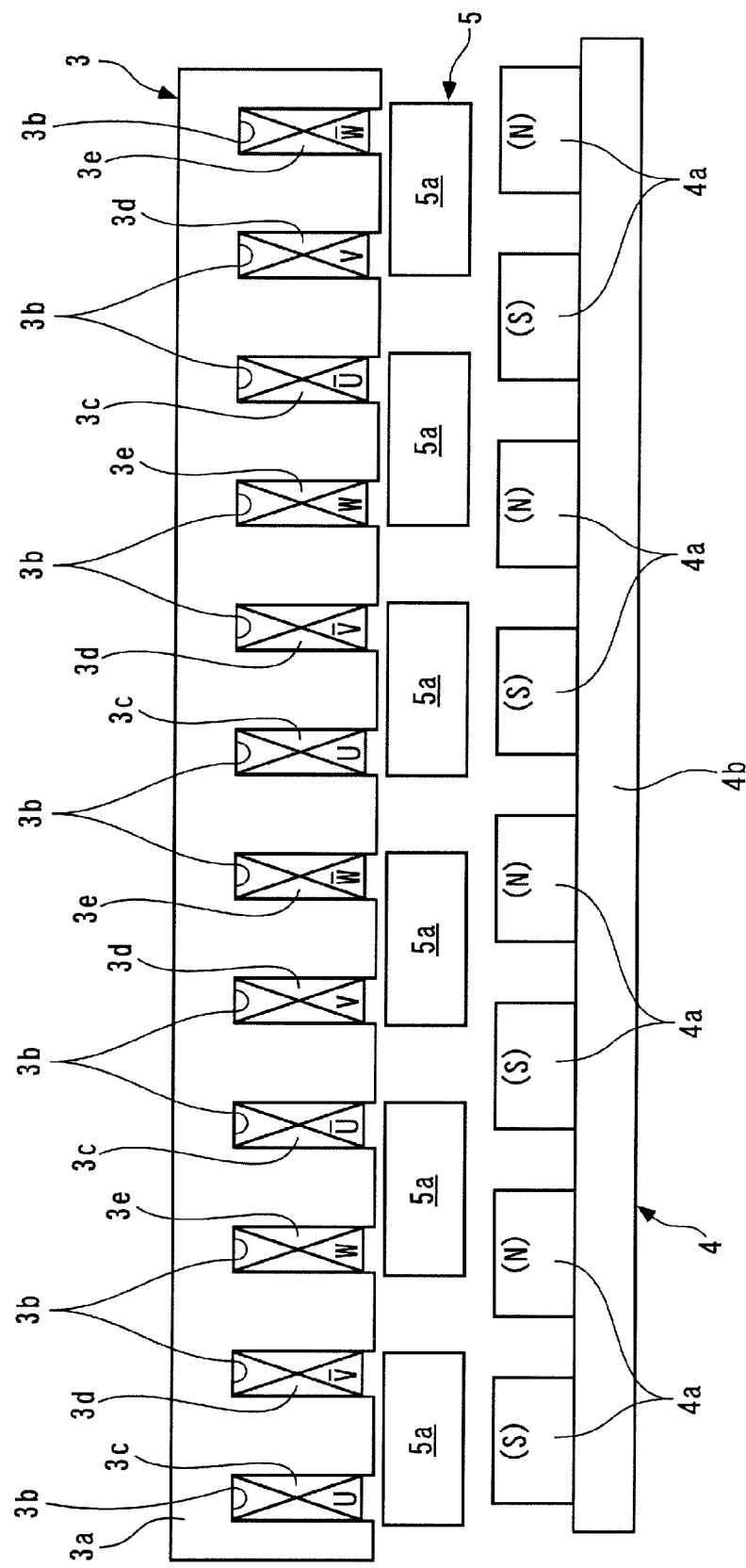
FIG. 3 A schematic development view showing the stator and the first and second rotors of the electric motor in FIG. 1, in a state developed in the circumferential direction.

The stator 3 is for generating rotating magnetic fields and as shown in FIG. 3, includes an iron core 3a, and U-phase, V-phase and W-phase coils 3c, 3d and 3e provided on the iron core 3a. It should be noted that in FIG. 1, only the U-phase coil 3c is shown for convenience. The iron core 3a, which has a hollow cylindrical shape formed by laminating a plurality of steel plates, extends in the direction of axis of the first rotating shaft 6 (hereinafter simply referred to as "in the axial direction" or "axially"), and is mounted on the inner peripheral surface of the peripheral wall 2a of the casing 2. Further, the inner peripheral surface of the iron core 3a is formed with twelve slots 3b. The slots 3b extend in the axial direction, and are arranged at equally-spaced intervals in the circumferential direction of the first rotating shaft 6 (hereinafter simply referred to as "in the circumferential direction" or "circumferentially"). The U-phase to W-phase coils 3c to 3e are wound in the slots 3b by distributed winding (wave winding), and are connected to a variable power supply 15 (see FIG. 2). The variable power supply 15 is a combination of an electric circuit comprised of an inverter, and a battery, and is connected to the ECU 16.

Figure 5:
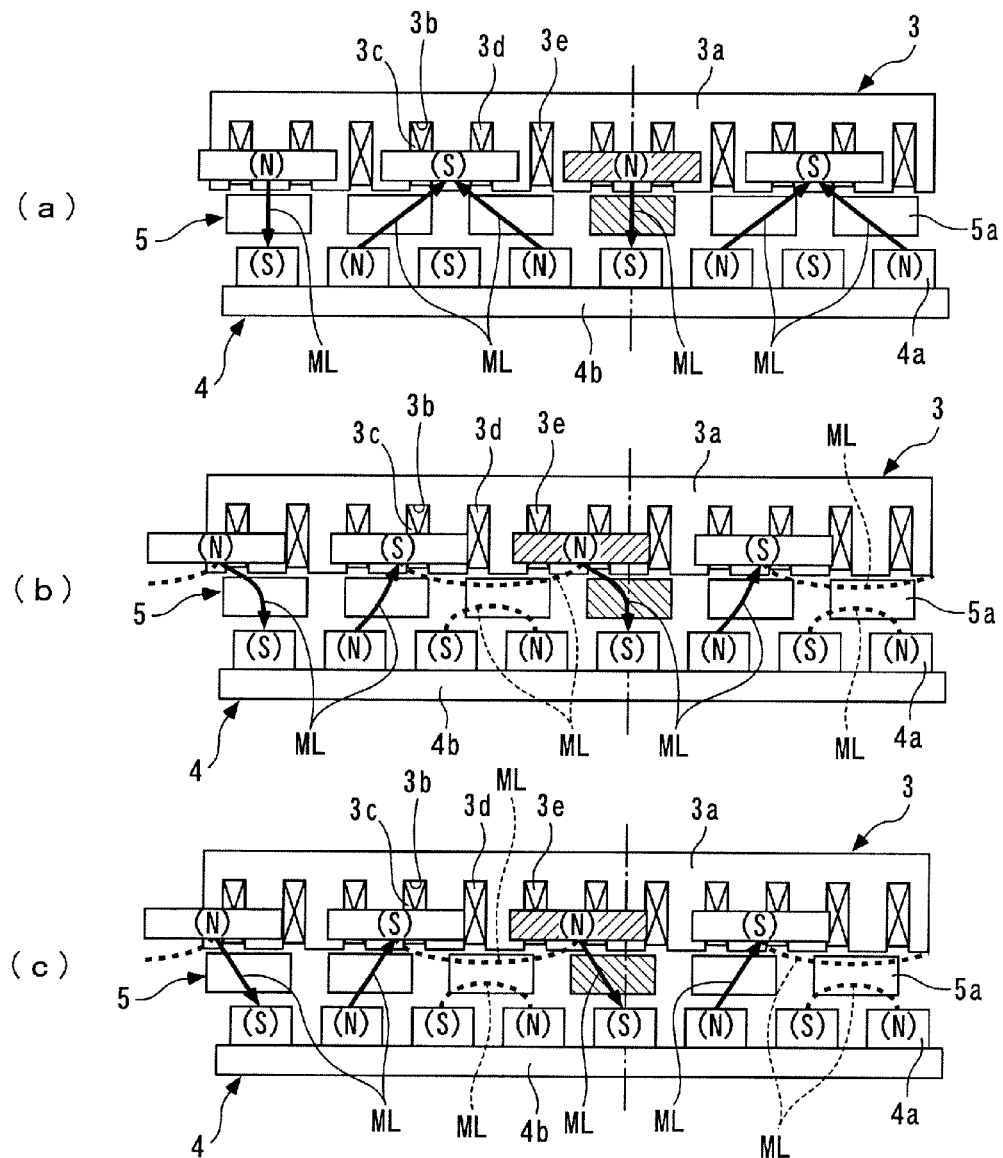
FIG. 5 A diagram illustrating the operation of the FIG. 1 electric motor in a case where electric power is supplied to the stator in a state of the first rotor being fixed.

In the stator 3 configured as above, when electric power is supplied from the variable power supply 15, four magnetic poles are generated at an end of the iron core 3a toward the first rotor 4 at equally-spaced intervals in the circumferential direction (see FIG. 5), and rotating magnetic fields caused by the magnetic poles rotate in the circumferential direction. Hereinafter, the magnetic poles generated on the iron core 3a are referred to as "the armature magnetic poles". Further, each two armature magnetic poles which are circumferentially adjacent to each other have polarities different from each other. It should be noted that in FIG. 5 and other figures, referred to hereinafter, the armature magnetic poles are represented by (N) and (S) over the iron core 3a and the U-phase to W-phase coils 3c to 3e.

As shown in FIG. 3, the first rotor 4 includes a magnetic pole row comprised of eight permanent magnets 4a. These permanent magnets 4a are arranged at equally-spaced intervals in the circumferential direction, and the magnetic pole row is opposed to the iron core 3a. Each permanent magnet 4a extends in the axial direction, and the length thereof in the axial direction is set to the same length as that of the iron core 3a of the stator 3.

Further, the permanent magnets 4a are mounted on an outer peripheral surface of an annular fixing portion 4b. This annular fixing portion 4b is formed by laminating soft magnetic material elements, such as iron or a plurality of steel plates, and has an inner peripheral surface thereof attached to the outer peripheral surface of a disk-shaped flange 4c integrally concentrically formed with the first rotating shaft 6. Thus, the first rotor 4 including the permanent magnets 4a is rotatable in unison with the first rotating shaft 6. Further, the permanent magnets 4a are attached to the outer peripheral surface of the annular fixing portion 4b formed by the soft magnetic material elements, as described above, and hence a magnetic pole of (N) or (S) appears on an end of each permanent magnet 4a toward the stator 3. It should be noted that in FIG. 3 and other figures, referred to hereinafter, the magnetic poles of the permanent magnets 4a are denoted by (N) and (S). Further, each two permanent magnets 4a circumferentially adjacent to each other have polarities different from each other.

The second rotor 5 includes a soft magnetic material element row comprised of six cores 5a. These cores 5a are arranged at equally-spaced intervals in the circumferential direction, and the soft magnetic material element row is disposed between the iron core 3a of the stator 3 and the first rotor 4 at predetermined spaced intervals. Each core 5a is formed by laminating soft magnetic material elements, such as a plurality of steel plates, and extends in the axial direction. Further, similarly to the permanent magnet 4a, the length of the core 5a in the axial direction is set to the same length as that of the iron core 3a of the stator 3. Furthermore, the core 5a is mounted on an outer end of a disk-shaped flange 5b by a hollow cylindrical connecting portion 5c slightly extending in the axial direction. This flange 5b is integrally concentrically formed with the second rotating shaft 7. This arrangement makes the second rotor 5 including the cores 5a rotatable in unison with the second rotating shaft 7. It should be noted that in FIG. 3, the connecting portion 5c and the flange 5b are omitted for convenience.

Further, as shown in FIG. 2, the electric motor 1 is provided with a first rotational position sensor 21 and a second rotational position sensor 22, each of an electromagnetic induction type. The first rotational position sensor 21 detects the rotational angle position of a specific permanent magnet 4a of the first rotor 4 (hereinafter referred to as "the first rotor rotational angle θR1") with respect to a specific U-phase coil 3c of the stator 3 (hereinafter referred to as "the reference coil"), and delivers a signal indicative of the sensed first rotor rotational angle θR1 to the ECU 16. The above-described second rotational position sensor 22 detects the rotational angle position of a specific core 5a of the second rotor 5 with respect to the reference coil (hereinafter referred to as "the second rotor rotational angle θR2"), and delivers a signal indicative of the sensed second rotor rotational angle θR2 to the ECU 16.

Furthermore, the electric motor 1 is provided with a first current sensor 23 and a second current sensor 24. The first and second current sensors 23 and 24 detect currents flowing through the respective U-phase and V-phase coils 3c and 3d (hereinafter referred to as "the U-phase current Iu" and "the V-phase current Iv"), and deliver signals indicative of the sensed U-phase current Iu and V-phase current Iv to the ECU 16, respectively.

The ECU 16 is implemented by a microcomputer comprised of an I/O interface, a CPU, a RAM and a ROM, and controls the operation of the electric motor 1 based on the detection signals from the aforementioned sensors 21 to 24.

It should be noted that in the present embodiment, the permanent magnets 4a correspond to the magnetic poles in the present invention, and the first rotor 4 and the first rotating shaft 6 correspond to a first structure in the present invention. Further, the iron core 3a and the U-phase to W-phase coils 3c to 3e correspond to armatures in the present invention, and the stator 3 corresponds to a second structure in the present invention. Furthermore, the cores 5a correspond to the soft magnetic material elements in the present invention, and the second rotor 5 and the second rotating shaft 7 correspond to a third structure in the present invention. Further, the ECU 16 corresponds to control means in the present invention, and the first and second rotational position sensors 21 and 22 correspond to relative positional relationship-detecting means in the present invention.

As described hereinabove, the electric motor 1 includes four armature magnetic poles, eight magnetic poles of the permanent magnets 4a (hereinafter referred to as "the magnet magnetic poles") and six cores 5a. That is, the ratio between the number of the armature magnetic poles, the number of the magnet magnetic poles, and the number of the cores 5a (hereinafter referred to as "the pole number ratio") is set to 1:2.0: (1+2.0)/2. As is clear from this setting and the aforementioned equations (18) to (20), counter-electromotive force voltages, which are generated by the U-phase to W-phase coils 3c to 3e as the first rotor 4 and the second rotor 5 rotate with respect to the stator 3 (hereinafter referred to as "the U-phase counter-electromotive force voltage Vcu", "the V-phase counter-electromotive force voltage Vcv" and "the W-phase counter-electromotive force voltage Vcw", respectively), are expressed by the following equations (33), (34) and (35).

$$Vcu = -3 \cdot \psi F[(3 \cdot \omega ER2 - 2 \cdot \omega ER1)\sin(3 \cdot \theta ER2 - 2 \cdot \theta ER1)] \quad (33)$$

$$Vcv = -3 \cdot \psi F\left[(3 \cdot \omega ER2 - 2 \cdot \omega ER1)\sin\left(\begin{array}{c}3 \cdot \theta ER2 - \\ 2 \cdot \theta ER1 - \frac{2\pi}{3}\end{array}\right)\right] \quad (34)$$

$$Vcw = -3 \cdot \psi F\left[(3 \cdot \omega ER2 - 2 \cdot \omega ER1)\sin\left(\begin{array}{c}3 \cdot \theta ER2 - \\ 2 \cdot \theta ER1 + \frac{2\pi}{3}\end{array}\right)\right] \quad (35)$$

In these equations, I represents the amplitude (maximum value) of current flowing through the U-phase to W-phase coils 3c to 3e, and ψF represents the maximum value of magnetic fluxes of the magnet magnetic poles. θER1 represents a value obtained by converting the first rotor rotational angle θR1 as a so-called mechanical angle to an electrical angular position (hereinafter referred to as "the first rotor electrical angle"), that is, a value obtained by multiplying the first rotor rotational angle θR1 by a pole pair number of the armature magnetic poles, i.e. a value of 2. θER2 represents a value obtained by converting the second rotor rotational angle θR2 as a mechanical angle to an electrical angular position (hereinafter referred to as "the second rotor electrical angle"), more specifically, a value obtained by multiplying the second rotor rotational angle θR2 by a pole pair number (value of 2) of the armature magnetic poles. Further, ωER1 represents a value obtained by differentiating θER1 with respect to time, i.e. a value obtained by converting an angular velocity of the first rotor 4 with respect to the stator 3 to an electrical angular velocity (hereinafter referred to as "the first rotor electrical angular velocity"). Furthermore, ωER2 represents a value obtained by differentiating θER2 with respect to time, i.e. a value obtained by converting an angular velocity of the second rotor 5 with respect to the stator 3 to an electrical angular velocity (hereinafter referred to as "the second rotor electrical angular velocity").

Further, as is clear from the above-described pole number ratio and the aforementioned equations (21) to (23), the U-phase current Iu, the V-phase current Iv and current (hereinafter referred to as "the W-phase current Iw") flowing through the W-phase coil 3e are expressed by the following equations (36), (37) and (38), respectively.

$$Iu = I \cdot \sin(3 \cdot \theta ER2 - 2 \cdot \theta ER1) \tag{36}$$

$$Iv = I \cdot \sin\left(3 \cdot \theta ER2 - 2 \cdot \theta ER1 - \frac{2\pi}{3}\right) \tag{37}$$

$$Iw = I \cdot \sin\left(3 \cdot \theta ER2 - 2 \cdot \theta ER1 + \frac{2\pi}{3}\right) \tag{38}$$

Furthermore, as is clear from the above-described pole number ratio and the aforementioned equations (24) and (25), the electrical angular position of a vector of the rotating magnetic fields of the stator 3 with respect to the reference coil (hereinafter referred to as "the magnetic field electrical angular position θMFR") is expressed by the following equation (39), and the electrical angular velocity of the rotating magnetic fields with respect to the stator 3 (hereinafter referred to as "the magnetic field electrical angular velocity ωMFR") is expressed by the following equation (40):

$$\theta MFR = 3 \cdot \theta ER2 - 2 \cdot \theta ER1 \tag{39}$$

$$\omega MFR = 3 \cdot \omega ER2 - 2 \cdot \omega ER1 \tag{40}$$

Figure 4:
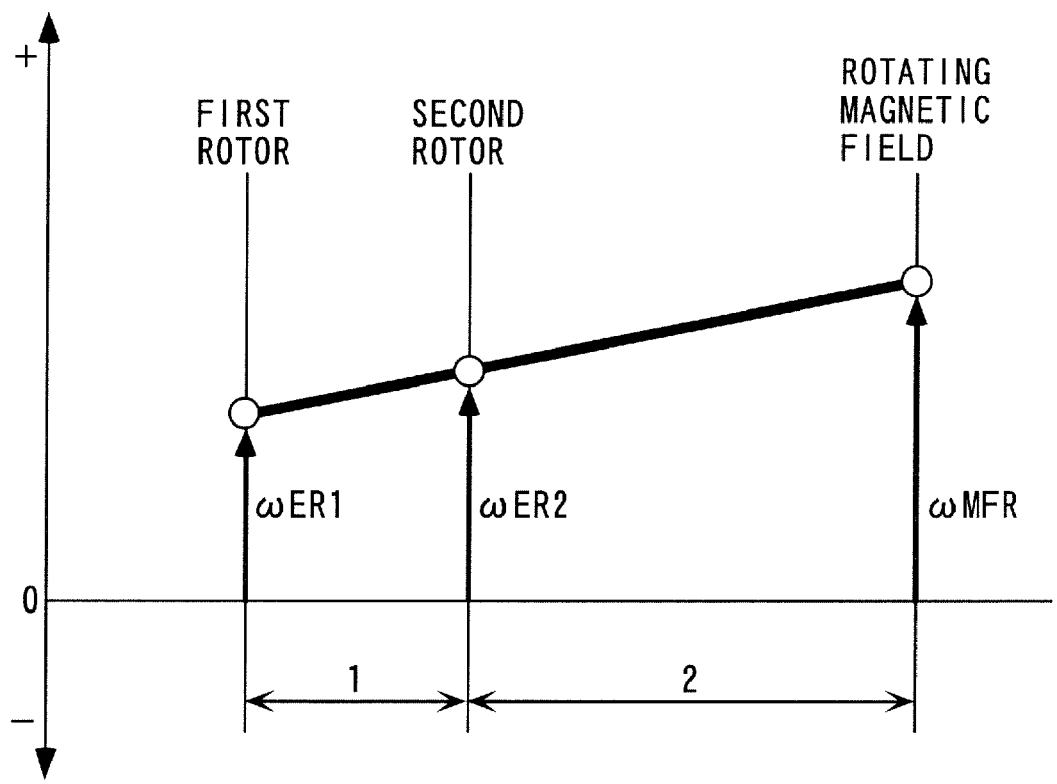
FIG. 4 A collinear chart illustrating an example of the relationship between a magnetic field electrical angular velocity, and first and second rotor electrical angular velocities of the electric motor in FIG. 1.

Therefore, when the relationship between the magnetic field electrical angular velocity ωMFR, the first rotor electrical angular velocity ωER1, and the second rotor electrical angular velocity ωER2 is expressed by a so-called collinear chart, it can be shown as in FIG. 4, for example.

Further, assuming that torque equivalent to electric power supplied to the stator 3 and the magnetic field electrical angular velocity ωMFR is a driving equivalent torque TSE, as is clear from the above-described pole number ratio and the aforementioned equation (32), the relationship between the driving equivalent torque TSE, torque TR1 transmitted to the first rotor 4 (hereinafter referred to as "the first rotor transmission torque TR1"), and torque TR2 transmitted to the second rotor 5 (hereinafter referred to as "the second rotor transmission torque TR2") is expressed by the following equation (41):

$$TSE = \frac{TR1}{2} = \frac{-TR2}{3} \tag{41}$$

The relationship of the electrical angular velocity expressed by the equation (40), and the relationship between the torques expressed by the equation (41) are quite the same as the relationship between the rotational speed of the sun gear, that of the ring gear, and that of the carrier of a planetary gear unit having a gear ratio between the sun gear and the ring gear set to 1:2, and the relationship between torques thereof.

The ECU 16 controls energization of the U-phase to W-phase coils 3c to 3e based on the above-mentioned equation (39) to thereby control the rotating magnetic fields. More specifically, as shown in FIG. 2, the ECU 16 includes a target current-calculating section 16a, an electrical angle converter 16b, a current coordinate converter 16c, a difference-calculating section 16d, a current controller 16e, and a voltage coordinate converter 16f, and controls the currents Iu, Iv, and Iw of the U phase to W phase by so-called vector control, to thereby control the rotating magnetic fields. It should be noted that in the present embodiment, the electrical angle converter 16b corresponds to relative positional relationship-detecting means.

The target current-calculating section 16a calculates respective target values of d-axis current Id and q-axis current Iq (hereinafter referred to as "the target d-axis current Id_tar" and "the target q-axis current Iq_tar"), referred to hereinafter, and delivers the calculated target d-axis current Id and target q-axis current Iq to the difference-calculating section 16d. It should be noted that these target d-axis current Id_tar and target q-axis current Iq_tar are calculated e.g. according to load on the electric motor 1.

The first and second rotor rotational angles θR1 and θR2 detected by the first and second rotational position sensors 21 and 22 are input to the electrical angle converter 16b. The electrical angle converter 16b calculates the first and second rotor electrical angles θER1 and θER2 by multiplying the input first and second rotor rotational angles θR1 and θR2 by the pole pair number (value of 2) of the armature magnetic pole, and delivers the calculated first and second rotor electrical angles θER1 and θER2 to the current coordinate converter 16c and the voltage coordinate converter 16f.

In addition to the first and second rotor electrical angles θER1 and θER2, the U-phase and V-phase currents Iu and Iv detected by the first and second current sensors 23 and 24, respectively, are input to the current coordinate converter 16c. The current coordinate converter 16c converts the present U-phase to W-phase currents Iu to Iw on a three-phase AC coordinate system to the d-axis current Id and the q-axis current Iq on a dq coordinate system, based on the input U-phase and V-phase currents Iu and Iv, and the first and second rotor electrical angles θe1 and θe2. The dq coordinate system rotates at (3·ωER2−2·ωER1), with (3·θER2−2·θER1) as the d axis, and an axis orthogonal to the d axis as the q axis. More specifically, the d-axis current Id and the q-axis current Iq are calculated by the following equation (42):

$$\begin{bmatrix} Id \\ Iq \end{bmatrix} = \sqrt{\frac{2}{3}} \begin{bmatrix} \cos\begin{pmatrix} 3 \cdot \theta ER1 - \\ 2 \cdot \theta ER1 \end{pmatrix} & \cos\begin{pmatrix} 3 \cdot \theta ER2 - \\ 2 \cdot \theta ER1 - \frac{2}{3}\pi \end{pmatrix} & \cos\begin{pmatrix} 3 \cdot \theta ER2 - \\ 2 \cdot \theta ER1 + \frac{2}{3}\pi \end{pmatrix} \\ -\sin\begin{pmatrix} 3 \cdot \theta ER2 - \\ 2 \cdot \theta ER1 \end{pmatrix} & -\sin\begin{pmatrix} 3 \cdot \theta ER2 - \\ 2 \cdot \theta ER1 - \frac{2}{3}\pi \end{pmatrix} & -\sin\begin{pmatrix} 3 \cdot \theta ER2 - \\ 2 \cdot \theta ER1 + \frac{2}{3}\pi \end{pmatrix} \end{bmatrix} \begin{bmatrix} Iu \\ Iv \\ Iw \end{bmatrix} \tag{42}$$

Further, the current coordinate converter 16c delivers the calculated d-axis current Id and q-axis current Iq to the difference calculating-section 16d.

The difference-calculating section 16d calculates the difference between the input target d-axis current Id_tar and d-axis current Id (hereinafter referred to as "the d-axis current difference dId"), and calculates the difference between the input target q-axis current Iq_tar and q-axis current Iq (hereinafter referred to as "the q-axis current difference dIq"). Further, the difference calculating-section 16d delivers the calculated d-axis current difference dId and q-axis current difference dIq to the current controller 16e.

The current controller 16e calculates a d-axis voltage Vd and a q-axis voltage Vq based on the input d-axis current difference dId and q-axis current difference dIq with a predetermined feedback control algorithm, e.g. a PI control algorithm. This causes the d-axis voltage Vd to be calculated such that the d-axis current Id becomes equal to the target d-axis current Id_tar, and the q-axis voltage Vq to be calculated such that the q-axis current Iq becomes equal to the target q-axis current Iq_tar. Further, the current controller 16e delivers the calculated d-axis and q-axis voltages Vd and Vq to the voltage coordinate converter 16f.

The voltage coordinate converter 16f converts the input d-axis voltage Vd and q-axis voltage Vq to command values of the U-phase to W-phase voltages Vu, Vv, and Vw on the three-phase AC coordinate system (hereinafter referred to as "the U-phase voltage command value Vu_cmd", "the V-phase voltage command value Vv_cmd", and "the W-phase voltage command value Vw_cmd") based on the input first and second rotor electrical angles θER1 and θER2. More specifically, the U-phase to W-phase voltage command values Vu_cmd to Vw_cmd are calculated by the following equation (43):

$$\begin{bmatrix} Vu\_cmd \\ Vv\_cmd \\ Vw\_cmd \end{bmatrix} = \sqrt{\frac{2}{3}} \begin{bmatrix} \cos\left(\begin{array}{c} 3\cdot\theta ER2 - \\ 2\cdot\theta ER1 \end{array}\right) & -\sin\left(\begin{array}{c} 3\cdot\theta ER2 - \\ 2\cdot\theta ER1 \end{array}\right) \\ \cos\left(\begin{array}{c} 3\cdot\theta ER2 - \\ 2\cdot\theta ER1 - \frac{2}{3}\pi \end{array}\right) & -\sin\left(\begin{array}{c} 3\cdot\theta ER2 - \\ 2\cdot\theta ER1 - \frac{2}{3}\pi \end{array}\right) \\ \cos\left(\begin{array}{c} 3\cdot\theta ER2 - \\ 2\cdot\theta ER1 + \frac{2}{3}\pi \end{array}\right) & -\sin\left(\begin{array}{c} 3\cdot\theta ER2 - \\ 2\cdot\theta ER1 + \frac{2}{3}\pi \end{array}\right) \end{bmatrix} \begin{bmatrix} Vd \\ Vq \end{bmatrix} \quad (43)$$

Further, the voltage coordinate converter 16f delivers the calculated U-phase to W-phase voltage command values Vu_cmd to Vw_cmd to the aforementioned variable power supply 15.

In accordance therewith, the variable power supply 15 applies the U-phase to W-phase voltages Vu to Vw to the electric motor 1 such that the U-phase to W-phase voltages Vu to Vw become equal to the respective U-phase to W-phase voltage command values Vu_cmd to Vw_cmd, respectively, whereby the U-phase to W-phase currents Iu to Iw are controlled. In this case, these currents Iu to Iw are represented by the aforementioned equations (36) to (38), respectively. Further, the amplitude I of electric current is determined based on the target d-axis current Id_tar and the target q-axis current Iq_tar.

By the above-described control by the ECU 16, the magnetic field electrical angular position θMFR is controlled such that the aforementioned equation (39) holds, and the magnetic field electrical angular velocity ωMFR is controlled such that the aforementioned equation (40) holds.

The electric motor 1 configured as above is used, e.g. as follows: In a state where one of the first and second rotors 4 and 5 is fixed or power is input to one of them, electric power supplied to the stator 3 is converted to power and is output from the other of them. Further, when power is output simultaneously from both the first and second rotors 4 and 5, the power is used as a drive source of a device, such as contra-rotating propellers, in which negative torque satisfying the equation (41) simultaneously acts on the first and second rotors 4 and 5.

Figure 6:
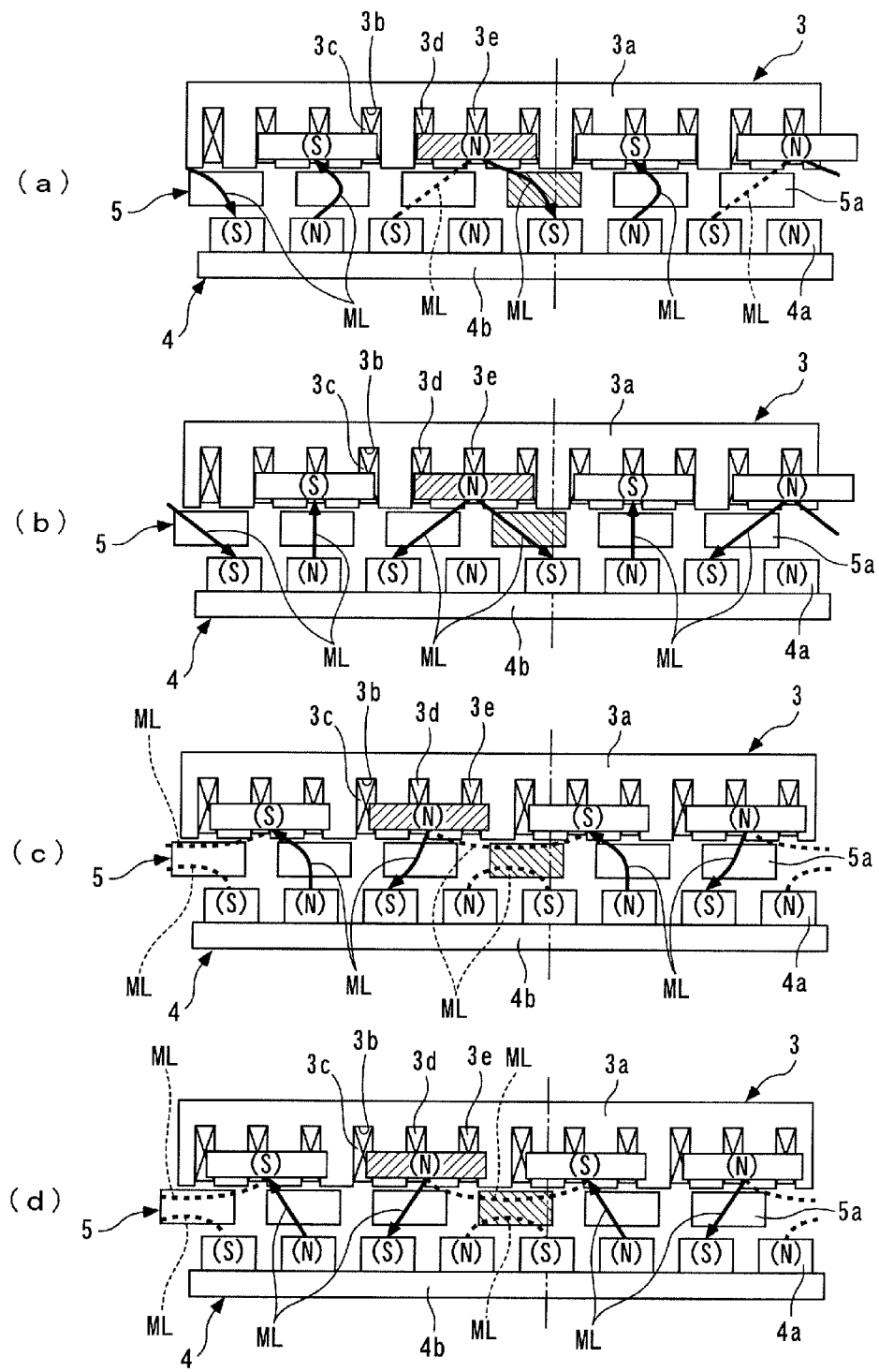
FIG. 6 A diagram illustrating a continuation of the operation in FIG. 5.
Figure 7:
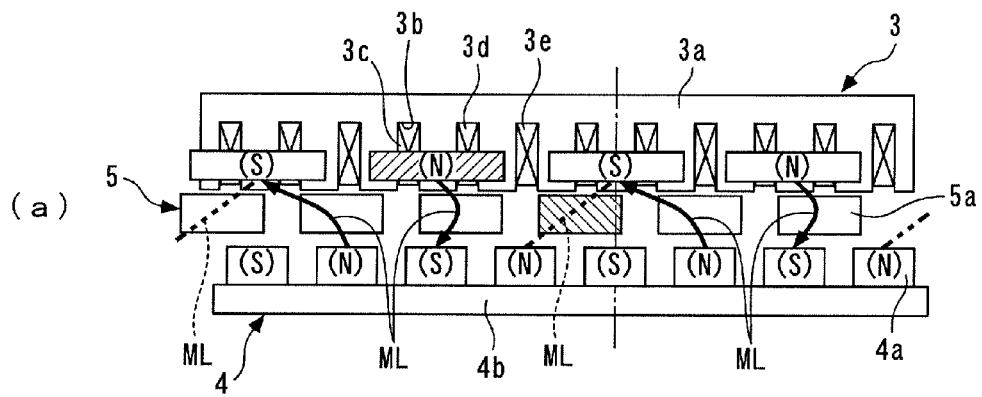
FIG. 7 A diagram illustrating a continuation of the operation in FIG. 6.

Next, a more specific description will be given of how electric power supplied to the stator 3 is converted to power and output from the first rotor 4 and the second rotor 5. First, a case where electric power is supplied to the stator 3 in a state in which the first rotor 4 is fixed will be described with reference to FIGS. 5 to 7. It should be noted that in FIGS. 5 to 7, reference numerals indicative of a plurality of component elements are omitted for convenience. This also applies to other figures, referred to hereinafter. Further, in FIGS. 5 to 7, one identical armature magnetic pole and one identical core 5a are indicated by hatching for clarity.

First, as shown in FIG. 5(a), from a state where the center of a certain core 5a and the center of a certain permanent magnet 4a are circumferentially coincident with each other, and the center of every three core 5a from the certain core 5a and the center of every four permanent magnets 4a from the certain permanent magnet 4a are circumferentially coincident with each other, the rotating magnetic fields are generated such that they rotate leftward, as viewed in FIG. 5(a). At the start of generation of the rotating magnetic fields, the positions of every two armature magnetic poles having the same polarity are caused to circumferentially coincide with the centers of the permanent magnets 4a the centers of which are coincident with the centers of the cores 5a, and the polarity of these armature magnetic poles is made different from the polarity of these magnet magnetic poles of the permanent magnets 4a.

As described hereinabove, the rotating magnetic fields are generated by the stator 3 between the stator 3 and the first rotor 4, and the second rotor 5 having the cores 5a is disposed between the stator 3 and the first rotor 4, so that the cores 5a are magnetized by the armature magnetic poles and the magnet magnetic poles. Because of this fact and the fact that the cores 5a adjacent to spaces are spaced from each other, magnetic force lines ML are generated in a manner connecting the armature magnetic poles, the cores 5a, and the magnet magnetic poles. It should be noted that in FIGS. 5 to 7, magnetic force lines ML of the iron core 3a and the fixing portion 4b are omitted for convenience. This also applies to other figures, referred to hereinafter.

In the state shown in FIG. 5(a), the magnetic force lines ML are generated such that they each connect an armature magnetic pole, a core 5a and a magnet magnetic pole circumferential positions of which are coincident with each other, and at the same time they connect armature magnetic poles, cores 5a and magnet magnetic poles which are adjacent to circumferentially opposite sides of the above armature magnetic pole, core 5a, and magnet magnetic pole. Further, in this state, since the magnetic force lines ML are straight, no magnetic forces for circumferentially rotating the cores 5a act on the cores 5a.

When the armature magnetic poles rotate from the positions shown in FIG. 5(a) to respective positions shown in FIG. 5(b) in accordance with rotation of the rotating magnetic fields, the magnetic force lines ML are bent, and accordingly magnetic forces act on the cores 5a such that the magnetic force lines ML become straight. In this case, the magnetic force lines ML are bent at the cores 5a in a manner curved in the direction opposite to the direction of rotation of the rotating magnetic fields (hereinafter referred to as "the magnetic field rotation direction") convexly with respect to the straight lines each connecting an armature magnetic pole and a magnet magnetic pole which are connected to each other by an associated one of the magnetic force lines ML. Therefore, the above-described magnetic forces act on the cores 5a to drive the cores 5a in the magnetic field rotation direction. The cores 5a are driven in the magnetic field rotation direction by such action of the magnetic forces caused by the magnetic force lines ML, for rotation to respective positions shown in FIG. 5(c), and the second rotor 5 provided with the cores 5a, and the second rotating shaft 7 also rotate in the magnetic field rotation direction. It should be noted that broken lines in FIGS. (5b) and 5(c) indicate that the magnetic flux amount of the magnetic force lines ML is very small, and the magnetic connection between the armature magnetic poles, the cores 5a, and the magnet magnetic poles is weak. This also applies to other figures, referred to hereinafter.

As the rotating magnetic fields further rotate, a sequence of the above-described operations, that is, the operations that "the magnetic force lines ML are bent at the cores 5a in a manner convexly curved in the direction opposite to the magnetic field rotation direction→the magnetic forces act on the cores 5a such that the magnetic force lines ML become linear→the cores 5a, the second rotor 5, and the second rotating shaft 7 rotate in the magnetic field rotation direction" are repeatedly performed as shown in FIGS. 6(a) to 6(d), and FIGS. 7(a) and 7(b). As described above, the action of the magnetic forces caused by the magnetic force lines ML converts electric power supplied to the stator 3 to power, and outputs the power from the second rotating shaft 7.

Figure 8:
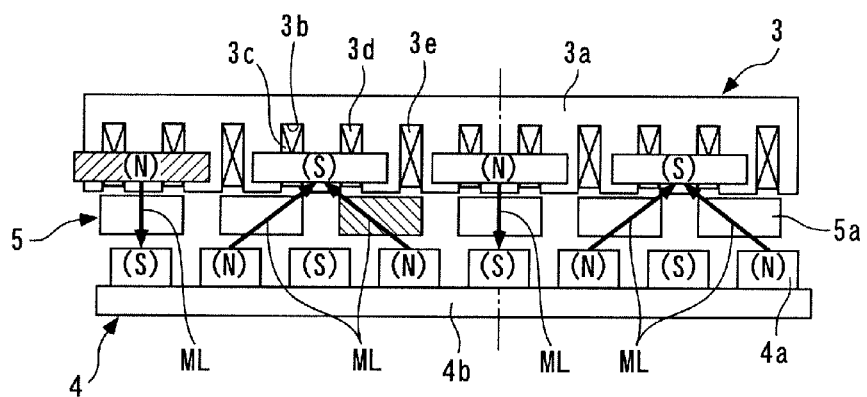
FIG. 8 A diagram illustrating the positional relationship between armature magnetic poles and cores in a case where the armature magnetic poles rotate by an electrical angle of $2\pi$ from the state shown in FIG. 5.

FIG. 8 shows a state in which the armature magnetic poles rotate from the FIG. 5(a) state by an electrical angle of 2π. As is clear from comparison between FIG. 8 and FIG. 5(a), it is understood that the cores 5a rotate in the same direction by ⅓ of the rotational angle with respect to the armature magnetic poles. This agrees with the fact that by substituting ωER1=0 into the aforementioned equation (40), ωER2=ωMFR/3 is obtained.

Figure 9:
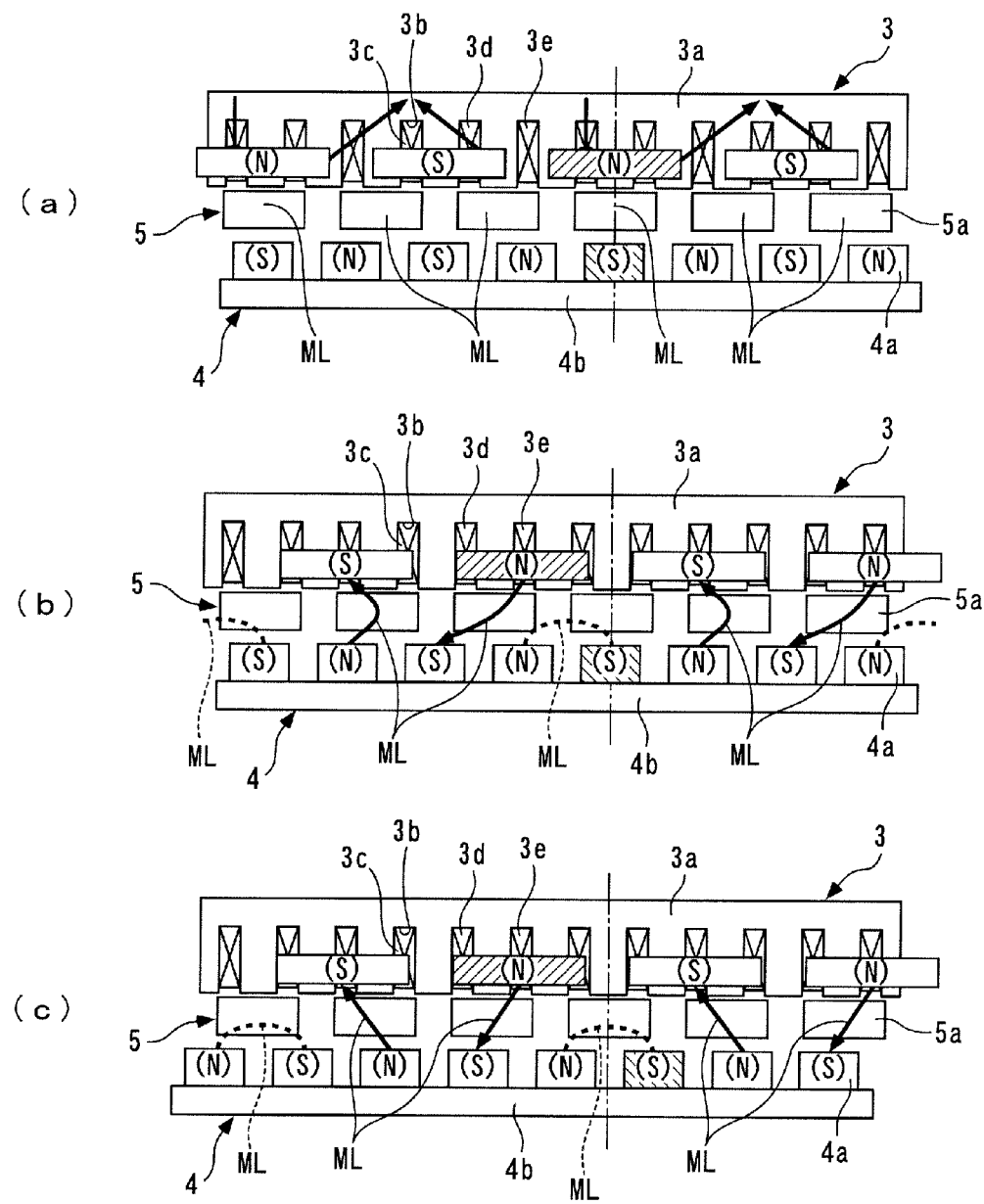
FIG. 9 A diagram illustrating the operation of the electric motor in FIG. 1 in a case where electric power is supplied to the stator in a state of the second rotor being fixed.
Figure 10:
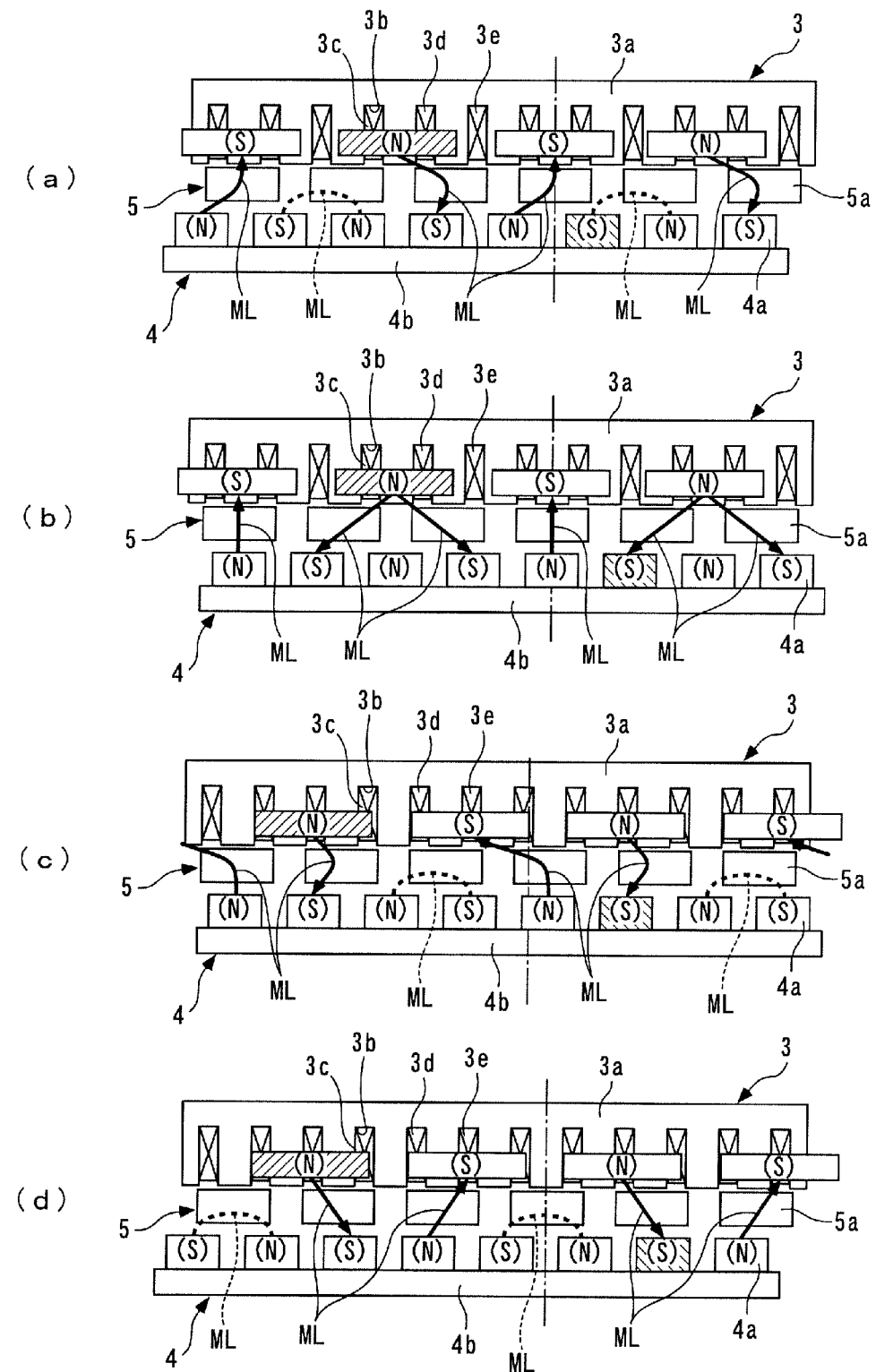
FIG. 10 A diagram illustrating a continuation of the operation in FIG. 9.
Figure 11:
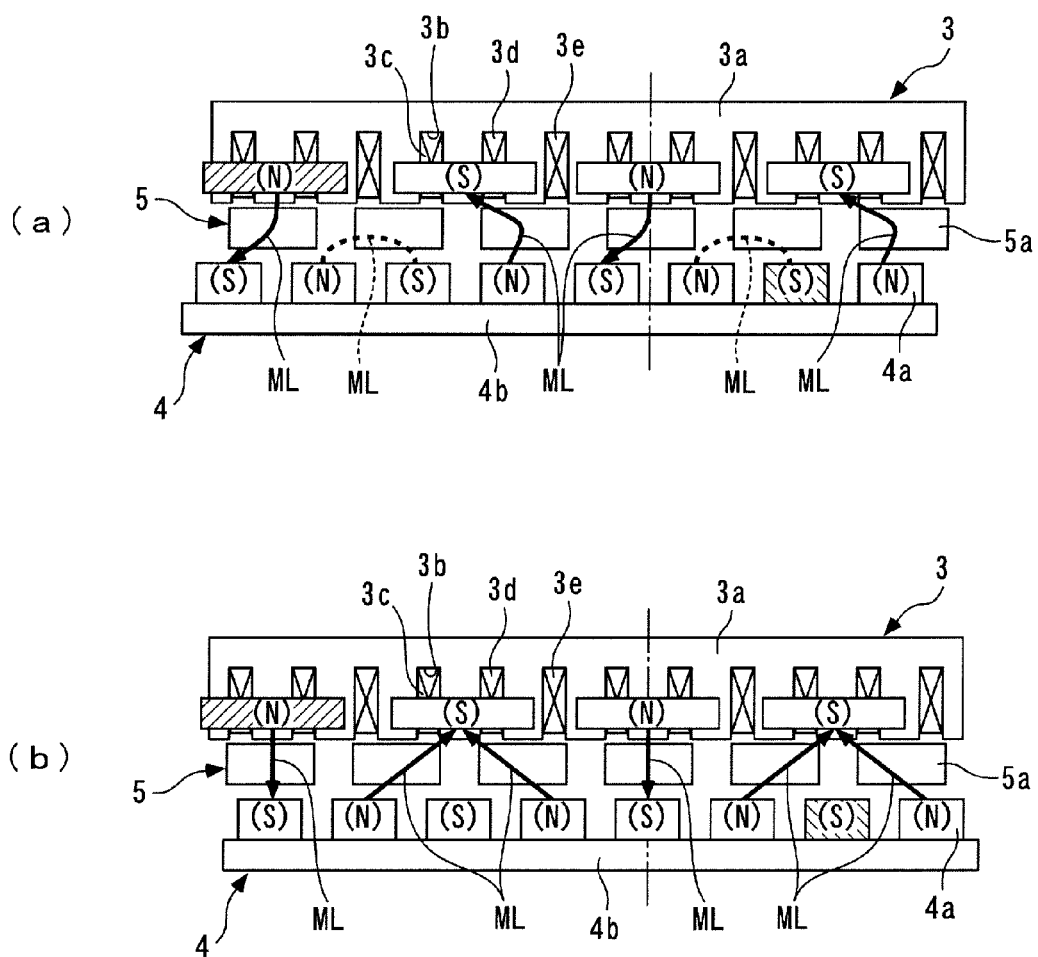
FIG. 11 A diagram illustrating a continuation of the operation in FIG. 10.

Next, an operation in the case where electric power is supplied to the stator 3 in a state in which the second rotor 5 is fixed will be described with reference to FIGS. 9 to 11. It should be noted that in FIGS. 9 to 11, one identical armature magnetic pole and one identical permanent magnet 4a are indicated by hatching for clarity. First, as shown in FIG. 9(a), similarly to the case shown in FIG. 5(a), from a state where the center of a certain core 5a and the center of a certain permanent magnet 4a are circumferentially coincident with each other, and the center of every three core 5a from the core 5a and the center of every four permanent magnets 4a from the permanent magnet 4a are circumferentially coincident with each other, rotating magnetic fields are generated such that they rotate leftward, as viewed in FIG. 5(a). At the start of generation of the rotating magnetic fields, the positions of every two armature magnetic poles having the same polarity are caused to circumferentially coincide with the centers of the permanent magnets 4a the centers of which are coincident with the centers of the cores 5a, and the polarity of these armature magnetic poles is made different from the polarity of these magnet magnetic poles of the permanent magnets 4a.

In the state shown in FIG. 9(a), similarly to the case shown in FIG. 5(a), magnetic force lines ML are generated such that they each connect an armature magnetic pole, a core 5a and a magnet magnetic pole circumferential positions of which are coincident with each other, and at the same time they connect armature magnetic poles, cores 5a and magnet magnetic poles which are adjacent to circumferentially opposite sides of the above armature magnetic pole, core 5a, and magnet magnetic pole. Further, in this state, since the magnetic force lines ML are straight, no magnetic forces for circumferentially rotating the permanent magnets 4a act on the permanent magnets 4a.

When the armature magnetic poles rotate from the positions shown in FIG. 9(a) to respective positions shown in FIG. 9(b) in accordance with rotation of the rotating magnetic fields, the magnetic force lines ML are bent, and accordingly magnetic forces act on the permanent magnets 4a such that the magnetic force lines ML become straight. In this case, the permanent magnets 4a are each positioned forward of a line of extension from an armature magnetic pole and a core 5a which are connected to each other by an associated one of the magnetic force lines ML, in the magnetic field rotation direction, and therefore the magnetic forces act on the permanent magnets 4a such that each permanent magnet 4a is caused to be positioned on the extension line, i.e. such that the permanent magnet 4a is driven in a direction opposite to the magnetic field rotation direction. The permanent magnets 4a are driven in a direction opposite to the magnetic field rotation direction by such action of the magnetic forces caused by the magnetic force lines ML, and rotate to respective positions shown in FIG. 9(c). The first rotor 4 provided with the permanent magnets 4a, and the first rotating shaft 6 also rotate in the direction opposite to the magnetic field rotation direction.

As the rotating magnetic fields further rotate, a sequence of the above-described operations, that is, the operations that "the magnetic force lines ML are bent→the permanent magnets 4a are each positioned forward of a line of extension from an armature magnetic pole and a core 5a which are connected to each other by an associated one of the magnetic force lines ML, in the magnetic field rotation direction→the magnetic forces act on the permanent magnets 4a such that the magnetic force lines ML become straight→the permanent magnets 4a, the first rotor 4, and the first rotating shaft 6 rotate in the direction opposite to the magnetic field rotation direction" are repeatedly performed as shown in FIGS. 10(a) to 10(d), and FIGS. 11(a) and 11(b). As described above, the action of the magnetic forces caused by the magnetic force lines ML converts electric power supplied to the stator 3 to power, and outputs the power from the first rotating shaft 6.

FIG. 11(b) shows a state in which the armature magnetic poles rotate from the FIG. 9(a) state by the electrical angle of 2π. As is clear from comparison between FIG. 11(b) and FIG. 9(a), it is understood that the permanent magnets 4a rotate in the opposite direction by ½ of the rotational angle with respect to the armature magnetic poles. This agrees with the fact that by substituting ωER2=0 into the aforementioned equation (40), −ωER1=ωMFR/2 is obtained.

Figure 12:
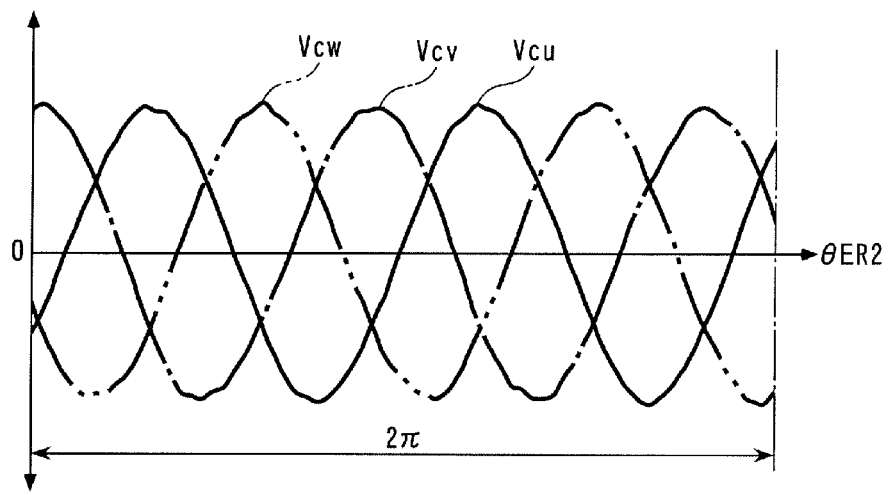
FIG. 12 A diagram illustrating an example of changes in U-phase to W-phase counter-electromotive force voltages in a case where the first rotor of the electric motor according to the present invention is fixed.
Figure 13:
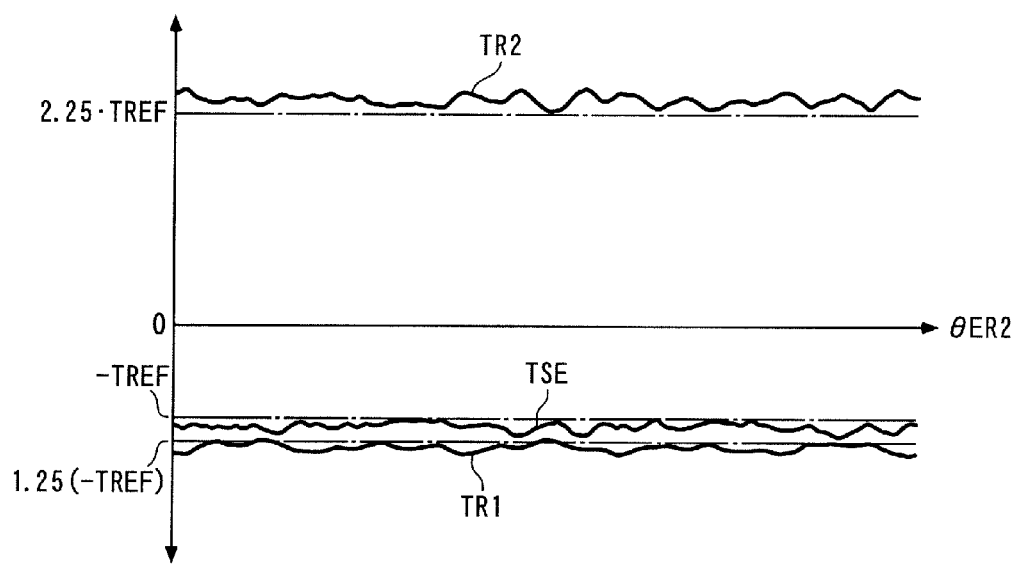
FIG. 13 A diagram illustrating an example of changes in a driving equivalent torque, and first and second rotor transmission torques in the case where the first rotor of the electric motor according to the present invention is fixed.

FIG. 12 and FIG. 13 show results of simulations of control in which the numbers of the armature magnetic poles, the cores 5a, and the permanent magnets 4a are set to 16, 18 and 20, respectively, the first rotor 4 is fixed, and power is output from the second rotor 5 by supplying electric power to the stator 3. FIG. 12 shows an example of changes in the U-phase to W-phase counter-electromotive force voltages Vcu to Vcw during a time period over which the second rotor electrical angle θER2 changes from 0 to 2π.

In this case, since the first rotor 4 is fixed, the pole pair numbers of the armature magnetic poles and the magnet magnetic poles are equal to 8 and 10, respectively, and the aforementioned equation (25) is applied, the relationship between the magnetic field electrical angular velocity ωMFR and the first and second rotor electrical angular velocities ωER1 and ωER2 is expressed by ωMFR=2.25·ωER2. As shown in FIG. 12, during a time period over which the second rotor electrical angle θER2 changes from 0 to 2π, the U-phase to W-phase counter-electromotive force voltages Vcu to Vcw are generated by approximately 2.25 periods. Further, FIG. 12 shows changes in the U-phase to W-phase counter-electromotive force voltages Vcu to Vcw change, as viewed from the second rotor 5. As shown in the figure, with the second rotor electrical angle θER2 as the horizontal axis, the counter-electromotive force voltages are arranged in the order of the W-phase counter-electromotive force voltage Vcw, the V-phase counter-electromotive force voltage Vcv, and the U-phase counter-electromotive force voltage Vcu. This represents that the second rotor 5 rotates in the magnetic field rotation direction. As described above, it was possible to confirm that ωMFR=2.25·ωER2 holds, also from the results of the simulation shown in FIG. 12.

Further, FIG. 13 shows an example of changes in the driving equivalent torque TSE, and the first and second rotor transmission torques TR1 and TR2. In this case, form the fact that the pole pair numbers of the armature magnetic poles and the fact that the magnet magnetic poles are equal to 8 and 10, respectively, and from the aforementioned equation (32), the relationship between the driving equivalent torque TSE, and the first and second rotor transmission torques TR1 and TR2 is represented by TSE=TR1/1.25=−TR2/2.25. As shown in FIG. 13, the driving equivalent torque TSE is approximately equal to −TREF, the first rotor transmission torque TR1 is approximately equal to 1.25·(−TREF), and the second rotor transmission torque TR2 is approximately equal to 2.25·TREF. This TREF represents a predetermined torque value (e.g. 200 Nm). As described above, it was possible to confirm that TSE=TR1/1.25=−TR2/2.25 holds, also from the results of the simulation shown in FIG. 13.

Figure 14:
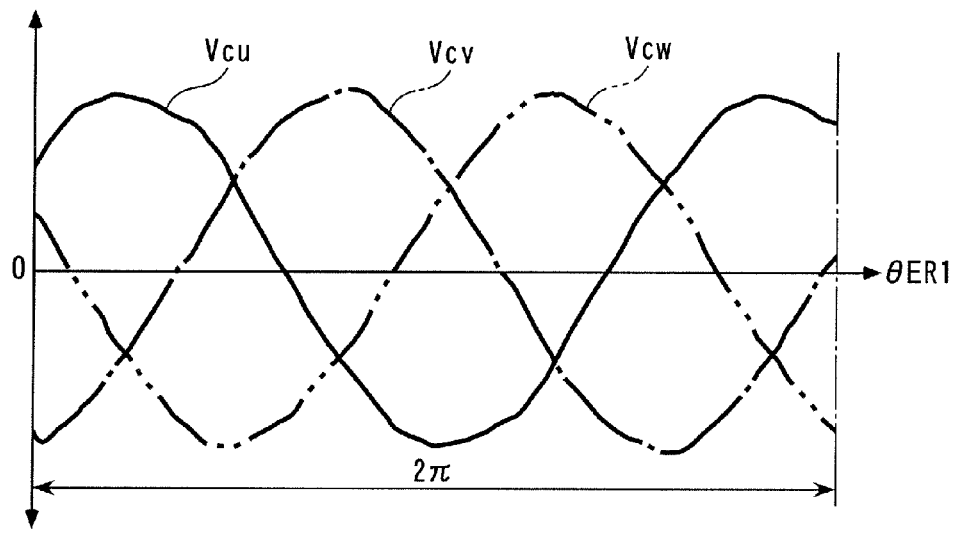
FIG. 14 A diagram illustrating an example of changes in the U-phase to W-phase counter-electromotive force voltages in the case where the second rotor of the electric motor according to the present invention is fixed.
Figure 15:
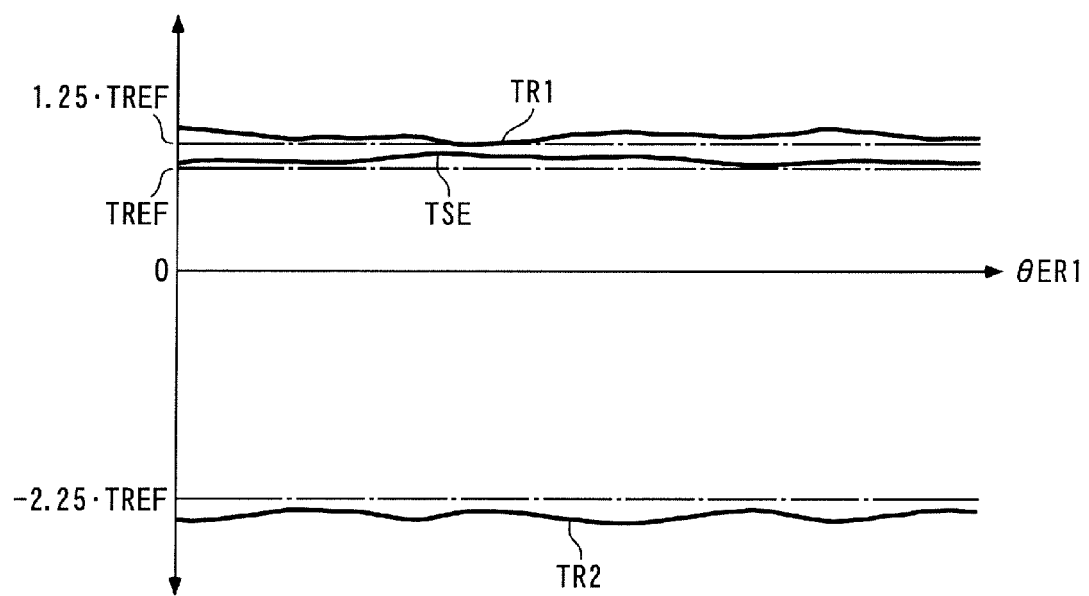
FIG. 15 A diagram illustrating an example of changes in the driving equivalent torque, and the first and second rotor transmission torques in the case where the second rotor of the electric motor according to the present invention is fixed.

FIGS. 14 and 15 show results of simulations of control in which the numbers of the armature magnetic poles, the cores 5a, and the permanent magnets 4a are set similarly to the cases illustrated in FIGS. 12 and 13, the second rotor 5 is fixed in place of the first rotor 4, and power is output from the first rotor 4 by supplying electric power to the stator 3. FIG. 14 shows an example of changes in the U-phase to W-phase counter-electromotive force voltages Vcu to Vcw during a time period over which the first rotor electrical angle θER1 changes from 0 to 2π.

In this case, since the second rotor 5 is fixed, the pole pair numbers of the armature magnetic poles and the magnet magnetic poles are equal to 8 and 10, respectively, and the aforementioned equation (25) is applied, the relationship between the magnetic field electrical angular velocity ωMFR, and the first and second rotor electrical angular velocities ωER1 and ωER2 is expressed by ωMFR=−1.25·ωER1. As shown in FIG. 14, the U-phase to W-phase counter-electromotive force voltages Vcu to Vcw are generated by approximately 1.25 periods during a time period over which the first rotor electrical angle θER1 changes from 0 to 2π. Further, FIG. 14 shows changes in the U-phase to W-phase counter-electromotive force voltages Vcu to Vcw change, as viewed from the first rotor 4. As shown in the figure, with the first rotor electrical angle θER1 as the horizontal axis, the counter-electromotive force voltages are arranged in the order of the U-phase counter-electromotive force voltage Vcu, the V-phase counter-electromotive force voltage Vcv, and the W-phase counter-electromotive force voltage Vcw. This represents that the first rotor 4 rotates in the direction opposite to the magnetic field rotation direction. As described above, it was possible to confirm that ωMFR=−1.25·ωER1 holds, also from the results of the simulation shown in FIG. 14.

Further, FIG. 15 shows an example of changes in the driving equivalent torque TSE, and the first and second rotor transmission torques TR1 and TR2. Also in this case, similarly to the FIG. 13 case, the relationship between the driving equivalent torque TSE, and the first and second rotor transmission torques TR1 and TR2 is represented by TSE=TR1/1.25=−TR2/2.25 from the aforementioned equation (32). As shown in FIG. 15, the driving equivalent torque TSE is approximately equal to TREF, the first rotor transmission torque TR1 is approximately equal to 1.25·TREF, and the second rotor transmission torque TR2 is approximately equal to −2.25·TREF. As described above, it was possible to confirm that TSE=TR1/1.25=−TR2/2.25 holds, also from the results of the simulation shown in FIG. 15.

As described heretofore, according to the present embodiment, the electric motor 1 can be operated simply by using the single soft magnetic material element row formed by the cores 5a, so that it is possible to reduce the size and manufacturing costs of the electric motor 1. Further, by setting the ratio of the pole pair number of the magnet magnetic poles to that of the armature magnetic poles, it is possible to freely set the relationship between the magnetic field electrical angular velocity ωMFR, and the first and second rotor electrical angular velocities ωER1 and ωER2, and the relationship between the driving equivalent torque TSE, and the first and second rotor transmission torques TR1 and TR2, which makes it possible to enhance the degree of freedom in design of the electric motor 1.

Furthermore, since the magnetic field electrical angular position θMFR is controlled such that the aforementioned equation (40) holds, it is possible to ensure the proper operation of the electric motor 1. Further, the magnetic poles of the permanent magnets 4a are used, and hence differently from the case where the magnetic poles of electromagnets are used, it is possible to dispense with electric circuits and coils for supplying electric power to the electromagnets. This makes it possible to further reduce the size of the electric motor 1 and simplify the construction thereof. Further, it is possible to dispense with a slip ring for supplying electric power to electromagnets when the magnetic poles of the electromagnets are used as the magnetic poles, thereby making it possible to downsize the electric motor 1 and increase efficiency thereof.

Although in the above-described first embodiment, the first and second rotors 4 and 5 are configured to be rotatable, this is not limitative, but one of the two 4 and 5 may be configured to be unrotatable and only the other is configured to be rotatable such that power is output from the other. In this case, since one of the first and second rotors 4 and 5 is configured to be unrotatable, it is only required to detect only the electrical angular position of the other of the two 4 and 5 by a sensor or the like and control the rotating magnetic fields according to the detected electrical angular position of the other, as is apparent from the fact that in the aforementioned equation (39), the electrical angular position of one of the two 4 and 5 becomes equal to 0. Further, the stator 3 may be configured to be rotatable. In this case, the electric motor is used e.g. as follows: In a state in which power is input to one of the first and second rotors 4 and 5, and the stator 3, electric power is supplied to the stator 3 to convert the electric power to power whereby the power is output from the other of the two 4 and 5. Alternatively, when in a state in which one of the first and second rotors 4 and 5 is fixed (or power is input to the one of the two 4 and 5), power is output simultaneously from the stator 3 and the other of the two 4 and 5, the electric motor is used as a drive source of a device, such as contra-rotating propellers, in which negative torque satisfying the equation (41) simultaneously acts on the stator 3 and the other.

Furthermore, although in the first embodiment, the rotational angle position of a specific permanent magnet 4a and that of a specific core 5a with respect to a reference coil, i.e. a specific U-phase coil 3c, are detected as the first and second rotor rotational angles θR1 and θR2, respectively, the rotational angle positions of other component parts may be detected insofar as they represent the rotational angle positions of the first and second rotors 4 and 5 with respect to the stator 3. For example, the rotational angle position of a specific portion of the fixing portion 4b or the first rotating shaft 6, and the rotational angle position of a specific portion of the flange 5b or the second rotating shaft 7, with respect to a specific V-phase coil 3d, a specific W-phase coil 3e, or a specific portion of the casing 2, may be detected as the first rotor rotational angle θR1 and the second rotor rotational angle θR2, respectively.

Further, although in the first embodiment, the magnetic field electrical angular position θMFR for use in controlling the rotating magnetic fields is calculated by the equation (39) using the first and second rotor rotational angles θR1 and θR2 detected by the first and second rotational position sensors 21 and 22, the magnetic field electrical angular position θMFR may be calculated by a method proposed in Japanese Patent Application No. 2007-280916. More specifically, a planetary gear unit in which the ratio between the number of teeth of a sun gear and the number of teeth of a ring gear is equal to the ratio between the number of armature magnetic poles and the number of magnet magnetic poles, and a single rotational position sensor are prepared. One of the sun gear and the ring gear is connected to the first rotor 4, and a carrier is connected to the second rotor 5, whereafter the rotational angle position of the other of the sun gear and the ring gear with respect to the specific U-phase coil 3c is detected by the rotational position sensor. In this case, when the number of the armature magnetic poles is larger than the number of the magnet magnetic poles, the sun gear is connected to the first rotor 4.

From the above, the rotational angle position detected by the above-described rotational position sensor is expressed by $(1+\gamma)\theta R2-\gamma \cdot \theta R1$, wherein γ represents the ratio of the number of the magnet magnetic poles to the number of the armature magnetic poles. As is clear from this fact, it is possible to determine the magnetic field electrical angular position θMFR for use in controlling the rotating magnetic fields by the planetary gear unit the single rotational position sensor, without detecting the rotational angle positions of the first and second rotors 4 and 5 separately by two sensors.

Further, although in the first embodiment, the stator 3 and the first rotor 4 are arranged at an outer location and an inner location in the radial direction, respectively, this is not limitative, but inversely, they may be arranged at an inner location and an outer location in the radial direction, respectively. Further, although the electric motor 1 is constructed as a so-called radial type motor by arranging the stator 3 and the first and second rotors 4 and 5 in the radial direction, the electric motor 1 may be constructed as a so-called axial type motor by arranging the stator 3 and the first and second rotors 4 and 5 in the axial direction.

Next, an electric motor 31 according to a second embodiment of the present invention will be described with reference to FIGS. 16 and 17. Differently from the first embodiment, the electric motor 31 shown in the figures is constructed as a linear motor, and is applied to a conveying apparatus. It should be noted that in FIG. 16, the component elements identical to those of the first embodiment are denoted by the same reference numerals. The following description is mainly given of different points from the first embodiment.

Figure 16:
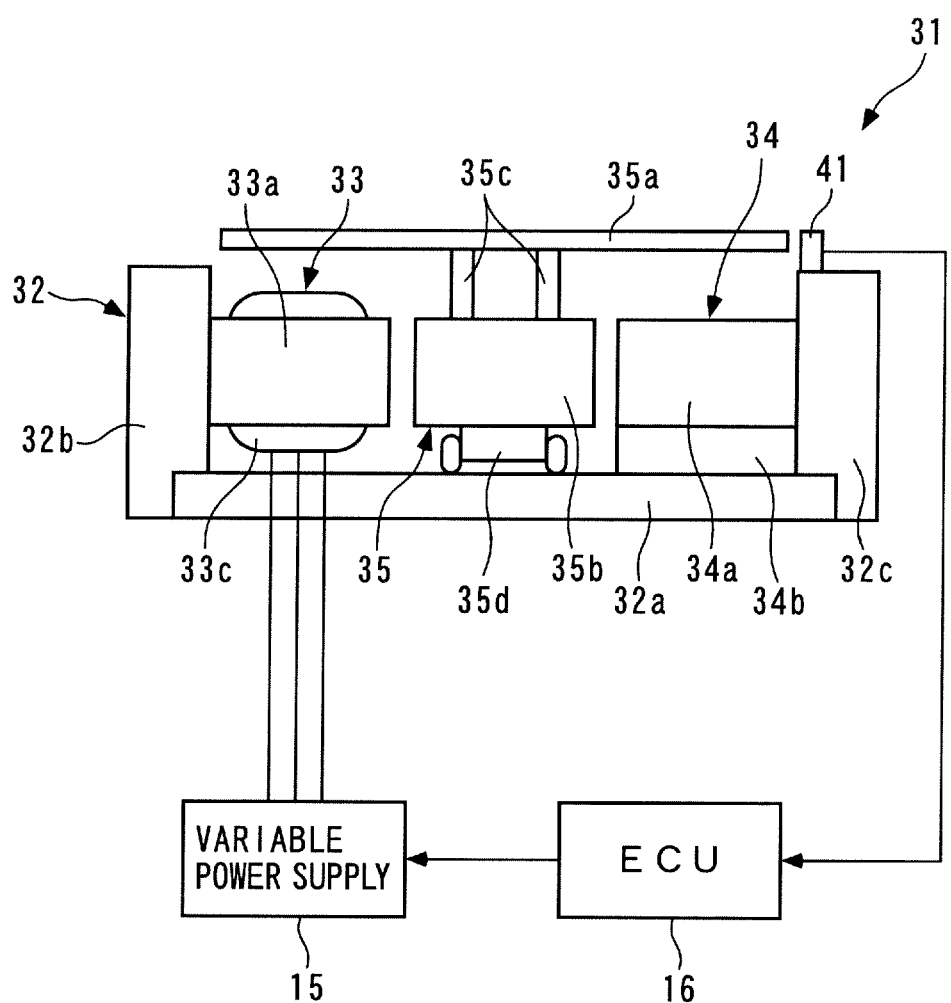
FIG. 16 A schematic front view of an electric motor according to a second embodiment of the present invention and associated parts.
Figure 17:
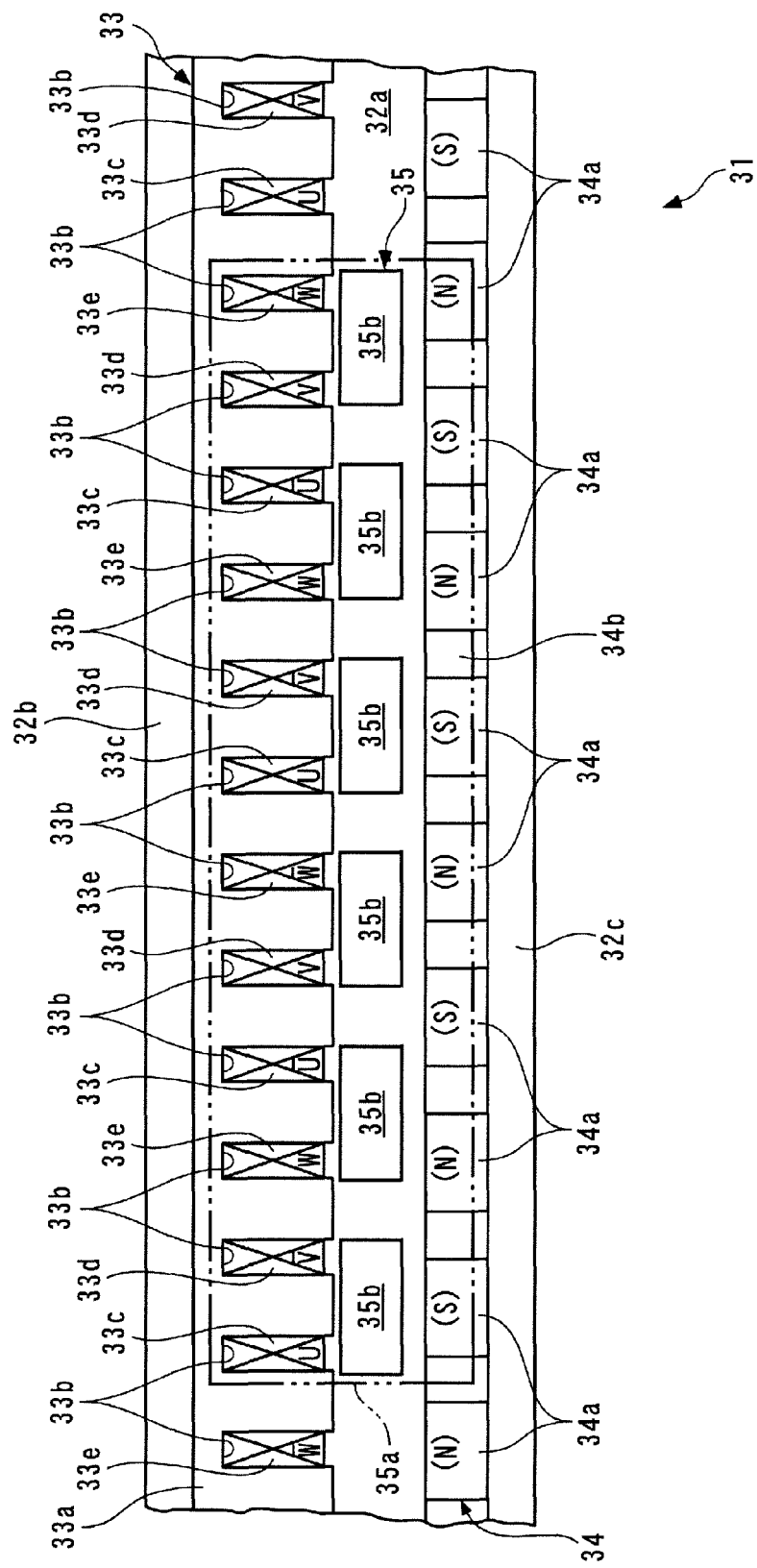
FIG. 17 A schematic plan view showing part of the electric motor in FIG. 16.

As shown in FIGS. 16 and 17, the electric motor 31 is comprised of an immovable casing 32, a first stator 33 disposed within the casing 32, a second rotor 34 disposed within the casing 32 in a manner opposed to the first stator 33, and a movable element 35 disposed between the stators 33 and 34.

The casing 32 includes a plate-shaped bottom wall 32a in which a front-rear direction (a direction away from the viewer, as viewed in FIG. 16, and a vertical direction, as viewed in FIG. 17) is referred to as a direction of length thereof, and side walls 32b and 32c which are formed integrally with the bottom wall 32a, and extend upward from opposite ends of the bottom wall 32a in a manner opposed to each other.

The first stator 33 is for generating moving magnetic fields and as shown in FIG. 17, includes an iron core 33a, and U-phase, V-phase and W-phase coils 33c, 33d and 33e provided on the iron core 33a. The iron core 33a, which in the form of a rectangular parallelepiped formed by laminating a plurality of steel plates, extends along the whole length of the casing 32 in the front-rear direction, and is mounted on the side wall 32b of the casing 32. Further, the iron core 33a has a large number of slots 33b formed in a surface thereof toward the second stator 34. The slots 33b extend in the vertical direction, and are arranged at equally-spaced intervals in the front-rear direction. The U-phase to W-phase coils 33c to 33e are wound in the slots 33b by distributed winding (wave winding), and are connected to the aforementioned variable power supply 15.

In the first stator 33 configured as above, when electric power is supplied from the variable power supply 15, a large number of magnetic poles are generated at an end of the iron core 33a toward the second stator 34 at equally-spaced intervals in the front-rear direction (see FIG. 18), and moving magnetic fields caused by the magnetic poles move in the front-rear direction. Hereinafter, similarly to the first embodiment, the magnetic poles generated on the iron core 33a are referred to as "the armature magnetic poles". It should be noted that in FIG. 18, similarly to FIG. 5, the armature magnetic poles are denoted by (N) and (S) over the iron core 33a and the U-phase to W-phase coils 33c to 33e. In this case, as shown in the figure, the number of the armature magnetic poles in a predetermined section INT along the front-rear direction is four.

Figure 18:
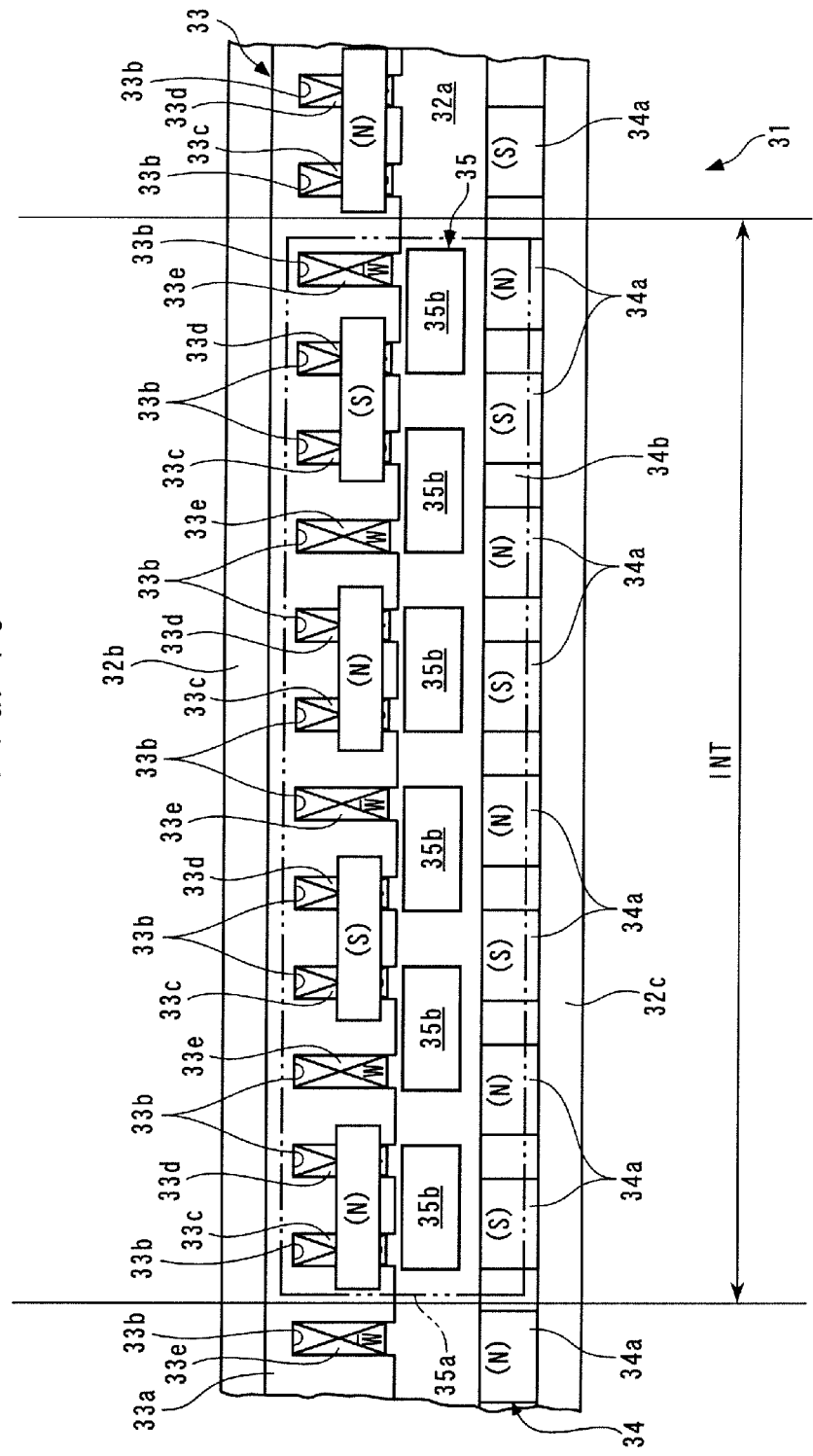
FIG. 18 A diagram illustrating the relationship between the numbers of the armature magnetic poles, the cores, and the magnetic poles of the electric motor in FIG. 16.

The second stator 34 includes a magnetic pole row comprised of a large number of permanent magnets 34a. These permanent magnets 34a are arranged at equally-spaced intervals in the front-rear direction, and the magnetic pole row is disposed in a manner opposed to the iron core 33a of the first stator 33. Each permanent magnet 34a is in the form of a rectangular parallelepiped, and the length thereof in the vertical direction is set to the same length as that of the iron core 33a. Further, the permanent magnets 34a are attached to a right end of an upper surface of the bottom wall 32a ("right" side, as viewed in FIG. 16) by a fixing portion 34b, while being attached to the side wall 32c. The fixing portion 34b is made of a soft magnetic material element, such as iron. The permanent magnets 34a are attached to the fixing portion 34b made of iron, as described above, and hence a magnetic pole of (N) or (S) appears on an end of each permanent magnet 34a toward the first stator 33. It should be noted that in FIGS. 17 and 18, similarly to FIG. 3, the magnetic poles of the permanent magnets 34a (hereinafter referred to as "the magnet magnetic poles", similarly to the first embodiment) are denoted by (N) and (S). Further, as shown in FIG. 18, each two permanent magnets 34a adjacent to each other in the front-rear direction have polarities different from each other, and the number of the permanent magnets 34a within the predetermined section INT is eight.

The movable element 35 includes a top plate 35a provided above the first and second stators 33 and 34, and a soft magnetic material element row formed by six cores 35b provided on the top plate 35a. The sizes of the top plate 35a in the front-rear direction and the left-right direction are smaller than those of the casing 32. The top plate 35a covers part of the first and second stators 33 and 34.

Each core 35b is in the form of a rectangular parallelepiped formed by laminating soft magnetic material elements, such as a plurality of steel plates, and the length thereof in the vertical direction is set to the same as that of the iron core 33a. Further, the six cores 35b are connected to each other by the top plate 35a via connecting portions 35c formed on upper ends thereof, and are arranged at equally-spaced intervals in the front-rear direction. Furthermore, the soft magnetic material element row formed by the cores 35b is disposed between the iron core 33a of the first stator 33 and the magnetic pole row of the second stator 34 at predetermined spaced intervals. Each core 35b has wheels 35d formed on a bottom thereof. The core 35b is placed on rails (not shown) formed on an upper surface of the bottom wall 32a via the wheels 35d, whereby the movable element 35 including the cores 35b is configured to be movable in the front-rear direction but immovable in the left-right direction. It should be noted that in FIGS. 17 and 18, the connecting portions 35c are omitted for convenience.

In the present embodiment, the stator 34 corresponds to the first structure in the present invention, and the permanent magnets 34a correspond to magnetic poles in the present invention. Further, the first stator 33 corresponds to the second structure in the present invention, and the iron core 33a and the U-phase to W-phase coils 33c to 33e correspond to the armatures in the present invention. Furthermore, the movable element 35 corresponds to the third structure in the present invention, and the cores 35b correspond to the soft magnetic material elements in the present invention.

Further, the electric motor 31 is provided with an optical position sensor 41 (relative positional relationship-detecting means) which delivers a detection signal indicative of the position of a specific core 35b of the movable element 35 with respect to a specific U-phase coil 33c of the first stator 33 (hereinafter referred to as "the movable element position"), to the ECU 16. The ECU 16 determines the relative positional relationship between the movable element 35 and the first and second stators 33 and 34, according to the detected movable element position, and based on the positional relationship, controls the energization of the U-phase to W-phase coils 33c to 33e, to thereby control the moving magnetic fields. More specifically, this control is performed as follows:

As shown in FIG. 18, in the predetermined section INT, similarly to the first embodiment, there are used four armature magnetic poles, eight magnet magnetic poles, and six cores 35b. That is, the ratio between the number of the armature magnetic poles, the number of the magnet magnetic poles, and the number of the cores 35b is set to 1:2:(1+2)/2. In the present embodiment, since the permanent magnets 34a is configured to be immovable and the aforementioned equation (39) is applied, the electrical angular position of a vector of the moving magnetic fields (hereinafter referred to as "the magnetic field electrical angular position $\theta$MFM") is controlled such that $\theta$MFM=3·$\theta$EM holds. This $\theta$EM is a value obtained by converting the movable element position to an electrical angular position (hereinafter referred to as "the movable element electrical angular position"). More specifically, the $\theta$EM is a value obtained by multiplying the detected movable element position by the pole pair number of the armature magnetic pole, i.e. a value of 2. It should be noted that similarly to the first embodiment, the above control is performed by controlling the electric current flowing through the U-phase to W-phase coils 33c to 33e by vector control.

From the above, the electrical angular velocity of the moving magnetic fields (hereinafter referred to as "the magnetic field electrical angular velocity $\omega$MFM") is controlled such that $\omega$MFM=3·$\omega$EM is satisfied. This $\omega$EM denotes a value obtained by differentiating the movable element electrical angular position $\theta$EM with respect to time, i.e. a value obtained by converting the moving velocity of the movable element 35 to an electrical angular velocity (hereinafter referred to as "the movable element electrical angular velocity"). Further, if a thrust equivalent to electric power supplied to the first stator 33 and the magnetic field electrical angular velocity $\omega$MFM is denoted by a driving equivalent thrust FSE, the relationship between the driving equivalent thrust FSE and a thrust FM transmitted to the movable element 35 (hereinafter referred to as "movable element transmission thrust FM") is expressed by FSE=−FM/3 from the aforementioned equation (41), As described above, according to the present embodiment, similarly to the first embodiment, the electric motor 31 can be operated only by a single soft magnetic material element row comprised of six cores 35b, so that it is possible to reduce the size and manufacturing costs of the electric motor 1. Further, by setting the ratio of the pole pair number of the magnet magnetic poles to that of the armature magnetic poles within the predetermined section INT, it is possible to freely set the relationship between the magnetic field electrical angular velocity $\omega$MFM and the movable element electrical angular velocity $\omega$EM, and the relationship between the driving equivalent thrust FSE and the movable element transmission thrust FM, and hence it is possible to enhance the degree of freedom in design of the electric motor 31.

Furthermore, since the magnetic field electrical angular position $\theta$MFM is controlled such that $\theta$MFM=3·$\theta$EM holds, it is possible to ensure the proper operation of the electric motor 31. Further, similarly to the first embodiment, the magnetic poles of the permanent magnets 34a are used, whereby it is possible to further reduce the size of the electric motor 31 to simplify the construction thereof.

It should be noted that the electric motor 31 may be configured as follows: A second movable element is formed by connecting the plurality of permanent magnets 34a of the second stator 34 by a top plate other than the top plate 35a, and is configured to be movable in the front-rear direction with respect to the casing 32 such that similarly to the first embodiment, power can be output from at least one of the movable element 35 and the second movable element. In addition, a third movable element is formed by mounting the iron core 33a of the first stator 33 on the top plate such that the third movable element is movable in the front-rear direction with respect to the casing 32. Then, as described heretofore as to the first embodiment, power is output from the movable element 35, the second movable element, or the third movable element.

When the second movable element is provided as described above, not only the movable element position of the movable element 35 but also the position of the specific permanent magnet 34a of the second movable element with respect to the specific U-phase coil 33c is detected by a sensor, and the magnetic field electrical angular position θMFM is calculated based on the equation (39) according to the movable element position and the detected position of the second movable element. Then, the calculated magnetic field electrical angular position θMFM is used for controlling the rotating magnetic fields.

Although in the second embodiment, the position of the specific core 35a with respect to the specific U-phase coil 33c is detected as the movable element position, the position of another portion may be detected insofar as it represents the position of the movable element 35 with respect to the first stator 33. For example, the position of a specific portion, such as the top plate 35a, with respect to a specific V-phase coil 33d, a specific W-phase coil 33e, a specific portion of the casing 32 may be detected as the movable element position. This also applies to the case where the second movable element or the third movable element is provided, as described above.

It should be noted that the present invention is by no means limited to the above-described embodiments, but it can be practiced in various forms. For example, although in the above-described embodiments, a magnetic pole is formed by the magnetic pole of a single permanent magnet 4a or 34a, it may be formed by the magnetic poles of a plurality of permanent magnets. For example, if a magnetic pole is formed by arranging two permanent magnets in an inverted-V shape such that the magnetic poles thereof become closer to each other toward the stator 3 (first stator 33), it is possible to improve the directivity of a magnetic force line ML. Further, electromagnets or armatures that can generate moving magnetic fields may be used in place of the permanent magnets 4a or 34a used in the above-described embodiments. Further, although in the above-described embodiments, the U-phase to W-phase coils 3c to 3e and 33c to 33e are wound in the slots 3b and 33b by distributed winding, this is not limitative, but they may be wound in the slots by concentrated winding. Further, although in the above-described embodiments, the coils 3c to 3e and 33c to 33e are formed by three-phase coils of U-phase to W-phase, the number of phases can be set as desired insofar as the coils can generate moving magnetic fields (rotating magnetic fields).

Further, it is to be understood that a desired number of slots, other than that used in the above-described embodiments may be employed as the number of the slots 3b and 33b. Further, although in the above-described embodiments, the slots 3b and 33b, the permanent magnets 4a and 34a, and the cores 5b and 35b are arranged at equally-spaced intervals, they may be arranged at unequally-spaced intervals. Furthermore, although in the above-described embodiments, there are used four armature magnetic poles, eight magnet magnetic poles, and six cores 5a or 35b, desired numbers can be employed as the numbers of the armature magnetic poles, the magnet magnetic poles, and the cores insofar as the ratio therebetween satisfies $1:m:(1+m)/2$ $(m \neq 1.0)$. Further, although in the above-described embodiments, the first rotational position sensor 21, the second rotational position sensor 22, and the position sensor 41, are electromagnetic induction-type sensors, they may be optical type sensors. Furthermore, although in the above-described embodiments, the ECU 16 is used as the control means in the present invention, a combination of a microcomputer and electric circuits may be used. Further, it is possible to change details of the construction of the embodiment within the spirit and scope of the present invention.

INDUSTRIAL APPLICABILITY

The electric motor according to the present invention is capable of reducing the size and manufacturing costs thereof, and is very useful in enhancing the degree of freedom in design thereof.

The invention claimed is:

1. An electric motor comprising:
   a first structure including a magnetic pole row, said magnetic pole row being formed by a predetermined plurality of magnetic poles arranged in a predetermined direction, and having each two adjacent magnetic poles so disposed as to have polarities different from each other;
   a second structure including an armature row, said armature row being formed by a plurality of armatures arranged in the predetermined direction, and being disposed in a manner opposed to said magnetic pole row, for generating moving magnetic fields moving in the predetermined direction between said armature row and said magnetic pole row by a predetermined plurality of armature magnetic poles generated at said plurality of armatures in accordance with supply of electric power thereto; and
   a third structure including a soft magnetic material element row, said soft magnetic material element row being formed by a predetermined plurality of soft magnetic material elements arranged in the predetermined direction in a manner spaced from each other, and being disposed such that said soft magnetic material element row is positioned between said magnetic pole row and said armature row,
   wherein a ratio between a number of the armature magnetic poles, a number of the magnetic poles, and a number of said soft magnetic material elements, within a predetermined section along the predetermined direction is set to $1:m:(1+m)/2$ $(m \neq 1.0)$.

2. An electric motor as claimed in claim 1, further comprising:
   relative positional relationship-detecting means for detecting a relative positional relationship between said first to third structures; and
   control means for controlling the moving magnetic fields based on the detected relative positional relationship between said first to third structures.

3. An electric motor as claimed in claim 2, wherein said relative positional relationship-detecting means detects electrical angular positions of said first structure and said third structure with respect to said second structure, respectively, as the relative positional relationship between said first to third structures, and
   wherein said control means controls the moving magnetic fields based on a difference between a value obtained by multiplying the detected electrical angular position of said third structure by (1+m), and a value obtained by multiplying the detected electrical angular position of said first structure by m.

4. An electric motor as claimed in claim 1, wherein the magnetic poles are magnetic poles of permanent magnets.

5. An electric motor as claimed in claim 1, wherein the electric motor is a rotating machine.

6. An electric motor as claimed in claim 1, wherein the electric motor is a linear motor.

* * * * *